(12) United States Patent
Doshi et al.

(10) Patent No.: US 11,373,119 B1
(45) Date of Patent: Jun. 28, 2022

(54) FRAMEWORK FOR BUILDING, ORCHESTRATING AND DEPLOYING LARGE-SCALE MACHINE LEARNING APPLICATIONS

(71) Applicant: Amazon Technologies, Inc., Seattle, WA (US)

(72) Inventors: Bhavesh A. Doshi, Redmond, WA (US); Anand Dhandhania, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 573 days.

(21) Appl. No.: 16/369,884

(22) Filed: Mar. 29, 2019

(51) Int. Cl.
| | | |
|---|---|---|
| *G06N 20/00* | (2019.01) | |
| *H04L 41/16* | (2022.01) | |
| *H04L 47/70* | (2022.01) | |
| *G06N 5/04* | (2006.01) | |

(52) U.S. Cl.
CPC .............. *G06N 20/00* (2019.01); *G06N 5/04* (2013.01); *H04L 41/16* (2013.01); *H04L 47/70* (2013.01)

(58) Field of Classification Search
None
See application file for complete search history.

(56) References Cited

U.S. PATENT DOCUMENTS

| | | | | |
|---|---|---|---|---|
| 9,787,779 B2 * | 10/2017 | Frank | ................. | G06F 11/3476 |
| 2016/0012318 A1 * | 1/2016 | Bilenko | ............... | G06K 9/6807 |
| | | | | 382/159 |
| 2017/0093988 A1 * | 3/2017 | Rehaag | ............... | H04L 67/2842 |
| 2017/0180459 A1 * | 6/2017 | Frank | ................... | H04L 41/5048 |
| 2018/0268258 A1 * | 9/2018 | Tapia | ................... | G06K 9/6262 |
| 2018/0307509 A1 * | 10/2018 | Dai | ......................... | G06F 9/547 |
| 2018/0349201 A1 * | 12/2018 | Clark | ........................ | H04L 9/06 |
| 2019/0228261 A1 * | 7/2019 | Chan | ..................... | G06K 9/6253 |
| 2020/0145358 A1 * | 5/2020 | Yegorin | ................. | H04L 51/26 |
| 2020/0193221 A1 * | 6/2020 | Aftab | ................... | G06K 9/6253 |
| 2020/0301761 A1 * | 9/2020 | Bharti | ....................... | G06F 8/24 |

OTHER PUBLICATIONS

Eichorst et al. "How to Provision Complex, On-Demand Infrastructures by Using Amazon API Gateway and AWS Lambda" posted at <https://aws.amazon.com/blogs/compute/how-to-provision-complex-on-demand-infrastructures-by-using-amazon-api-gateway-and-aws-lambda/> on Sep. 12, 2017. (Year: 2017).*

* cited by examiner

*Primary Examiner* — Scott B Christensen
(74) *Attorney, Agent, or Firm* — Nicholson De Vos Webster & Elliott LLP

(57) ABSTRACT

Techniques for a framework for building, orchestrating, and deploying complex, large-scale Machine Learning (ML) or deep learning (DL) inference applications is described. A ML application orchestration service is disclosed that enables the construction, orchestration, and deployment of complex ML inference applications in a provider network. The disclosed service provides customers with the ability to define machine learning (ML) models and define transformation operations on data before and/or after being provided to the ML models to construct a complex ML inference application. The service provides a framework for the orchestration (co-ordination) of the workflow logic (e.g., of the request and/or response flows) involved in building and deploying a complex ML inference application in the provider network.

20 Claims, 9 Drawing Sheets

FRAMEWORK FOR BUILDING, ORCHESTRATING AND DEPLOYING LARGE-SCALE MACHINE LEARNING APPLICATIONS

BACKGROUND

The field of machine learning has become widely acknowledged as a likely significant driver of the future of technology. Organizations everywhere now seek to use machine learning techniques to address a wide variety of problems, such as optimizing aspects of their products, processes, customer experience, etc. While the high-level view of machine learning sounds simple—e.g., provide training data to a computer, to allow the computer to automatically learn from the training data to generate a model that can make predictions for other data—implementing machine learning techniques in practice can be tremendously difficult.

This difficulty is partially due to the underlying algorithmic and mathematical complexities of machine learning algorithms, which are typically developed by academic researchers or individuals at the forefront of the field. Additionally, it is also difficult to generate, update, and deploy useful models, which can be extremely time and resource consumptive and filled with complexities. Moreover, machine learning models tend to be extremely focused on particular use cases and operating environments, and thus any change to the underlying environment or use case may require a complete regeneration of a new model. Further, constructing and deploying machine learning technologies is quite different from traditional software engineering, and requires practices and architectures different from what traditional software engineering development teams are familiar with.

BRIEF DESCRIPTION OF DRAWINGS

Various embodiments in accordance with the present disclosure will be described with reference to the drawings, in which.

DETAILED DESCRIPTION

Figure 1:
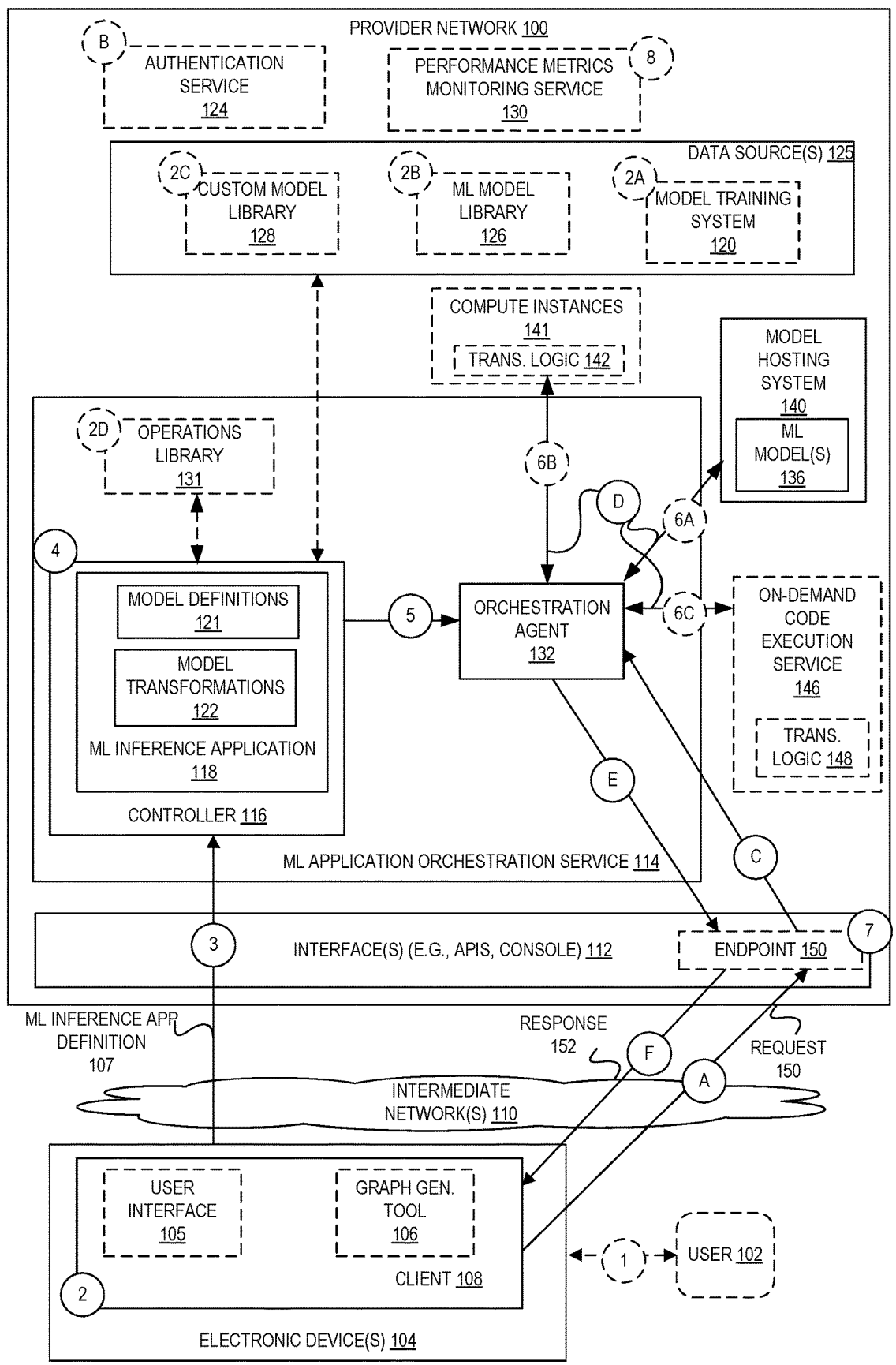
FIG. 1 is a diagram illustrating an environment for building, orchestrating, and deploying a machine learning (ML) inference application, according to some embodiments.

Various embodiments for a framework for building, orchestrating, and deploying complex, large-scale machine learning (ML) (e.g., deep learning (DL)) inference applications are described. According to some embodiments, a ML application orchestration service enables the construction, orchestration, and deployment of complex ML inference applications in a provider network. The ML application orchestration service provides users the ability to define ML models and define transformation operations performed on data before and/or after being provided to the ML models to construct a complex ML inference application. The ML application orchestration service, in some embodiments, also provides a framework for the orchestration (or co-ordination) of the workflow logic (e.g., of the request and/or response flows) involved in building and deploying a complex ML inference application in the provider network.

Complex ML-based applications may be built using multiple ML models. An "orchestration" as described herein may refer to the automated arrangement, coordination, and management of one or more models used to build a complex ML/DL application. To build these complex ML applications, application developers typically have to write their own custom code to deploy the various models and/or algorithms (e.g., in a provider network) and write custom orchestration logic (e.g., workflow logic, including possible transformation logic) to coordinate the request/response flows involving these various models. As the complexity of the orchestration logic increases, the amount of time and work spent on writing and building these code transformations also increases thus reducing the efficiency of building such complex large-scale ML applications.

While creating a complex ML application is a time-intensive operation, so is managing the orchestration of the ML application throughout its life cycle. The orchestration of request and/or response flows across different multiple ML models can change significantly within a short duration of time when changes in model definitions occur. Deploying these changes in an orchestration across multiple models can be error prone and require considerable manual intervention. Another challenge involved in building large-scale ML applications is implementing the ability to be able to scale the computing resources used by individual models and/or algorithms in the orchestration in response to varying customer loads. Each component (e.g., a ML model) may need to be scaled individually based on the number of requests passing through that component. The traffic received for a component may additionally depend significantly on the type of operation being performed by that component and require custom solutions built specifically for that component to perform its operation.

Embodiments of the disclosed ML application orchestration service address these and other issues by providing a framework for building, orchestrating, and deploying complex ML applications. The ML application orchestration service, in some embodiments, enables the orchestration of the workflow logic (e.g., the request and/or response flows) involved in building complex ML inference applications. Embodiments of the disclosed service monitor traffic patterns to the ML application (and/or components thereof) and can automatically scale computing resources required by the individual computing nodes (e.g., implementing ML models or transformation logic) in the orchestration to address varying traffic patterns and/or loads within the provider network. Additionally, embodiments of the disclosed service provide for different optimization strategies for orchestrating the deployment of the ML inference application based on parameters such as performance (throughput), latency, etc. The disclosed service, in some embodiments, can monitor performance metrics related to the deployment and execution of the ML inference application across the different request and/or response flows within the ML inference application. The various features provided by embodiments of the ML application orchestration service are discussed in detail with reference to the figures below.

FIG. 1 is a diagram illustrating an environment for building, orchestrating, and deploying a ML inference application comprising one or more ML models, according to some embodiments. In one embodiment, an ML application orchestration service 114 is disclosed that provides a framework for building, orchestrating, and deploying an ML inference application. In FIG. 1, the service 114 is shown as part of a provider network 100, though in other embodiments the service 114 may be implemented outside of a provider network 100, such as within a private or "on premise" network environment of an organization.

A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 110 (e.g., the internet) via one or more interface(s) 112, such as through use of application programming interface (API) calls, via a console implemented as a website or application, etc. The interface(s) 112 may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

In certain embodiments, the provider network 100 provides a ML application orchestration service 114 for building, orchestrating, and deploying a ML inference application comprising one or more ML models. In certain embodiments, the ML application orchestration service 114 comprises one or more components such as a controller 116 and an orchestration agent 132. These components may be implemented as software, hardware, or a combination of both using one or more multiple computing devices located at one or more multiple locations in the provider network 100.

As shown at (1), a user 102 may utilize a client application 108 of an electronic device 104 to construct a ML inference application definition 107 for an ML inference application. The ML inference application definition 107 identifies one or more ML models and optionally one or more data transformation operations to be used as part of an ML inference application that can be deployed and executed by the ML application orchestration service 114. The ML inference application definition 107 may be constructed to identify orderings in which one or more ML models and one or more transformation operations are to be performed—e.g., a first transformation operation is to be performed for an input data element, the resulting data is to be provided to a first ML model, a second transformation operation is to be performed for an output of the first ML model, and so on.

In some embodiments, the user 102 may utilize a user interface 105 of the electronic device 104 construct the ML inference application definition 107 for an ML inference application. The user interface 105 may include a text-based UI, a graphical UI (GUI), or a combination of both to enable the user to construct the ML inference application definition 107. For example, the user may input text to construct the ML inference application definition 107 or may select (e.g., via a mouse or touchscreen) graphical elements to create the ML inference application definition 107, or a combination of both.

In certain embodiments, the ML inference application definition 107 may be an inference graph generated by the user via the use of a graph generation tool 106 in an electronic device 104. For example, the user 102 may utilize an electronic device 104 such as a personal computer (PC), server computing device, mobile device such as a laptop, smart phone, tablet, etc., at (1) to construct a ML inference application definition 107 at (2) using the graph generation tool 106. In certain examples the ML inference application definition 107 may be represented as an "inference graph" comprising one or more nodes each representing a ML model and one or more edges each representing a data transformation operation to be performed on data to be provided to or generated by the ML models. For example, the user 102 may utilize the graph generation tool 106 to construct the inference graph by selecting graphical elements such as nodes and edges available in a library of available ML models and/or transformation operations, and/or specified/defined by the user. The nodes may represent one or more ML models that represent deployable units (e.g., comprising ML model definitions) with executable code that may be hosted and deployed by a model hosting system 140 (e.g., of a ML service) in the provider network 100. The edges may represent one or more data transformation operations to be performed on data to be provided to or generated by the ML models.

The user may select the various ML models and/or obtain model definitions for the ML models for the construction of the inference graph from different data sources 125 such as a model training system 120 at (2A), an ML model library 126 of pre-trained models at (2B), or even a user-specified or provided ML model, and load these models as nodes of the inference graph via the graph generation tool 106. The user may also select one or more custom models from a custom model library 128 at (2C) as nodes of the inference graph. The custom models in the custom model library 128 may be constructed and hosted by a third party or by the ML application orchestration service 114.

Similarly, the user may select the edges (representing data transformation operations) for the inference graph from an operations library 131 at (2D). In some embodiments, the operations library 131 may store code for a set of data transformation operations that the user 102 can choose from (and/or customize, such as via use of parameters such as arguments (e.g., that provide an input for a function) and/or attributes (e.g., that customize the operation of the operations)) when constructing the inference graph. Examples of data transformation operations may include pre-processing operations, post-processing operations, mapping operations, reduction operations, aggregation operations, batch operations, and so forth that may be performed on data to be provided to or generated by the ML models. However, in some embodiments, a data transformation operation may be more complex than these examples of transformations—for example, a data transformation operation may be a comparatively complex application that may perform multiple types of tasks/operations, possibly using various types of computing resources. Thus, a data transformation operation may be a relatively straightforward operation (e.g., performing a simple mathematical function) or a complex operation (e.g., an application including complex logic and/or processing). The manner in which some or all of these operations may be utilized to generate a ML inference application is described in greater detail below.

The operations library 131 may be constructed and hosted by a third party or by the ML application orchestration service 114. Additionally, or alternatively, in some embodiments the user 102 (or other user(s)) may create and submit other user-generated transformation operations (e.g., code for performing an operation) to the operations library 131 which then can be used to generate the ML inference application definition 107. In certain embodiments, users may create various ML models and publish them to the custom model library 128. The ML application orchestration service 114 may make these ML models and/or data transformation operations available to other users of the service. In certain embodiments, the ML application orchestration service 114 may track users' usage of the ML models and data transformation operations and may charge users for usage of these ML models and data transformation operations (e.g., in other ML inference applications). For example, the service 114 could charge a user based on the number of times a user executed a particular ML model and/or a data transformation operation in an ML inference application, and the service may thus compensate the author of the ML model or data transformation operation based on its usage. Further, in some embodiments the ML application orchestration service 114 may allow users to publish entire ML inference applications for use by other users. The ML application orchestration service 114 may similarly track the usage of these applications and potentially charge for their use and compensate the authors accordingly.

In certain embodiments, the ML inference application definition 107 may be represented as a text-based file that specifies a representation of one or more ML models and a representation of data transformation operations to be performed on data to be provided to or generated by the ML models. For instance, the text-based file may be generated by the user 102 via the user interface 105 in the client application 108 of the electronic device 104, generated by an application executed by the electronic device 104, etc. The representations may be of a same language and/or representation, allowing for a simplified creation and extremely efficient execution of a ML inference application for the user. For example, the representations could be constructed in a domain specific language (DSL), which may be a computer language specialized to a particular application domain, in contrast to a general-purpose language (GPL) that is broadly applicable across many domains.

The ML inference application definition 107, in some embodiments, may not represent and/or provide actual code for implementing the particular data transformation operations, but instead may specify the particular types of operations (optionally along with corresponding arguments/variables). Thus, a ML inference application definition 107 may be used to identify other functions/code that can be obtained and combined to generate a ML inference application. In other embodiments, the user 102 may also utilize an application (not shown in FIG. 1) provided via a browser as a web application (e.g., as a console providing interactivity with a service provider/cloud network), a general-purpose application (e.g., a text editor), or various Application Programing Interfaces (APIs) provided by one or more interfaces 112 in the provider network to construct the ML inference application definition 107.

In certain embodiments, as part of constructing a ML inference application definition, the user 108 may be able to select (e.g., via the UI 105 or the graph generation tool 106) between different optimization strategies for the deployment of the ML inference application at the ML application orchestration service 114. For instance, the user may be able to select different optimization strategies based on performance (throughput), the latency of computing resources in the provider network, etc. In some embodiments, the user may be able define batch sizes of requests that may be transmitted to the ML inference application, choose instance types (e.g., particular types or sizes of computing nodes) in the provider network to host the models and/or perform the transformation operations in the ML inference application, define a serial or parallel execution of one or more computing nodes in the ML inference application, select a Central Processing Unit (CPU)/Graphical Processing Unit (GPU) based deployment for the ML inference application, etc.

Further details about exemplary ML inference application definitions will be presented later herein with regard to FIG. 2. However, continuing with FIG. 1, the ML inference application definition 107 may be received at an endpoint (not shown in FIG. 1) in the provider network 100 and provided to the controller 116 in the ML application orchestration service 114. Upon receipt of the ML inference application definition 107 at (3) (or upon receipt of a message/command, such as a "compile" command issued using similar transport mechanisms), the controller 116 may construct a ML inference application 118 based on the ML inference application definition 107. In certain embodiments, the ML inference application definition 107 (e.g., in the form of an inference graph) may itself represent the ML inference application 118. In other embodiments, the controller 116 may construct a ML inference application 118 based on the ML inference application definition 107 by obtaining the code/logic for the ML models, (e.g., by retrieving it from the ML model library 126, custom model library 128, or the model training system 120) and/or the code/logic for the data transformation operations (by retrieving it from the operations library 131) defined in the ML inference application definition 107.

With the obtained code for the ML models (and/or ML model definitions) 121 and the model transformations 122, the controller 116 can combine this code together at circle (4) to generate the ML inference application 118. In some embodiments, the ML inference application 118 is made up of a single type of code/logic that can be deployed and executed by the orchestration agent 132. The orchestration agent 132 may include particular hardware and/or software (e.g., an operating system or another type of software/application) to deploy and execute the ML inference application 118. In some examples, the ML inference application 118 may be represented as a single symbolic execution graph. The symbolic execution graph identifies the set of nodes (e.g., ML models) and the edges between the nodes that represent execution flows (e.g., data transformation operations) through those nodes from one node to the next, needed for the deployment and execution of the ML inference application 118.

At (5), the controller 116 provides the ML inference application 118 (e.g., in the form of a symbolic execution graph) to the orchestration agent 132. The orchestration agent 132 receives the ML inference application 118 from the controller 116 and performs the necessary operations to deploy and execute the ML inference application. For instance, the orchestration agent 132 may identify an order of execution flows (operations) to be performed to deploy the ML inference application 118 based on the ML inference application definition (e.g., a symbolic execution graph) and provision the necessary computing resources to deploy the ML models and the data transformation operations defined in the ML inference application definition. For example, at (6A), the orchestration agent 132 may transmit one or more requests to a model hosting system 140 to deploy one or more ML models 136 identified in the ML inference application definition (or the symbolic execution graph). The request can include an identification of the ML model, e.g., a location of the ML model in the ML model library 126, custom model library 128, or model training system 120, the type and number of computing resources needed to host the ML model, etc. Example operations performed by the model hosting system 140 to deploy and host an ML model 136 are described in detail in FIG. 6. Upon the deployment of each ML model identified in the ML inference application definition, at (6A) the orchestration agent 132 may receive a web service endpoint where the ML model is available to provide inferences.

Similarly, the orchestration agent 132 may configure computing resources (e.g., one or more compute instances 141) at (6B) to execute the data transformation operations in accordance with the ML inference application definition (or the symbolic execution graph). The compute instances 141 may be obtained by the orchestration agent 132, for instance, from a hardware virtualization service (e.g., 820 shown in FIG. 8) that provides computation resources in the form of compute instances (e.g., VMs 824) the orchestration agent 132 can configure to execute data transform operations. The orchestration agent 132 may receive separate endpoints for each of the data transformations executed by the compute instances 141 at (6B). In certain embodiments, the data transformation operations may also be deployed as transformation logic 148 executed by an on-demand code execution service 146, and the orchestration agent may communicate with the on-demand code execution service 146 at (6C) for deploying the data transformations identified in the ML inference application definition.

In certain examples, the on-demand code execution service 146 may implement transformation logic 148 provided by a user or other entity as a "serverless" function that can be executed on demand. Serverless functions may be maintained within provider network 100 and may be associated with a particular user or account or may be generally accessible to multiple users and/or multiple accounts. A serverless function may be associated with a URL, URI, or other reference, which may be used to call the serverless function. A serverless function may be executed by a compute instance, such as a virtual machine, container, etc., when triggered or invoked. In some embodiments, a serverless function can be invoked through an API call or a specially formatted HTTP request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

After receiving separate web service endpoints for the ML model(s) and the data transformation operations defined in the ML inference application definition (or the symbolic execution graph), at (7), the orchestration agent 132 may "host" or "deploy" the ML inference application 118 which may include configuring a web service endpoint 150 for internal/external clients to issue inference requests to and receive inference results from. Alternatively, the orchestration agent 132 may provide the ML inference application 118 to the model hosting system 140 and optionally issue commands to the ML hosting system to run the ML inference application 118. In other embodiments, the orchestration agent 132 may also cause the ML inference application 118 to be provided back to one of the electronic devices 104 which may be executed by that device, or further deployed to other devices for use. These other devices may be a part of the provider network or be one or more devices (e.g., edge devices such as smart cameras, mobile devices etc.) that are outside the provider network.

For instance, at (A), a user (e.g., user 102) or a different user may utilize an electronic device 104 to issue a request 150 to the ML application orchestration service 114 via the endpoint 150 to execute a ML inference application. In some embodiments, the request 150 may be issued by a client 108 from a different electronic device 104 than that was used to generate the ML inference application definition. The provider network 100 may receive the request at the web service endpoint 150. The provider network may, at (B), authenticate the requesting user's access to the service 114 using an authentication service 124 in the provider network to determine if the user is a valid user issuing a request to the endpoint 150 and/or is a user granted permission to utilize the application. Upon successful user authentication, at (C), the request may be provided to the service 114, which is processed by the orchestration agent 132.

At (D), the orchestration agent 132 may transmit a plurality of requests to a plurality of computing resources (e.g., the model hosting system 140, the compute instances 141, the on-demand code execution service 146, etc.) in the provider network to execute the ML inference application in accordance with the ML inference application definition (or the symbolic execution graph). Execution of the ML inference application may result in the generation of one or more outputs (e.g., prediction or inference results) by the ML inference application. At (E), the orchestration agent 132 may obtain a result generated based on the execution of the ML inference application and cause a response 152 based on the result to be transmitted to the client application at (F). In certain examples, the orchestration agent may transform the result into a format that is suitable for the client prior to transmitting the result to the client.

In certain embodiments, the provider network 100 may include a performance metrics monitoring service 130 that generates performance metrics information related to the execution of the various computing nodes and computing resources in the provider network involved in the deployment and execution of the ML inference application. For instance, the performance metrics information may be made visible to the user via the UI 105 or the graph generation tool 106 in the electronic device 104 at (8). The performance metrics information could include one or more of, for example, execution trace information such as the amount of parallelization that was performed between the computing nodes, the failure points in the inference graph, the particular nodes that caused the failure, the execution time taken by each node to deploy a model or perform a data transformation operation, and so on.

Figure 2:
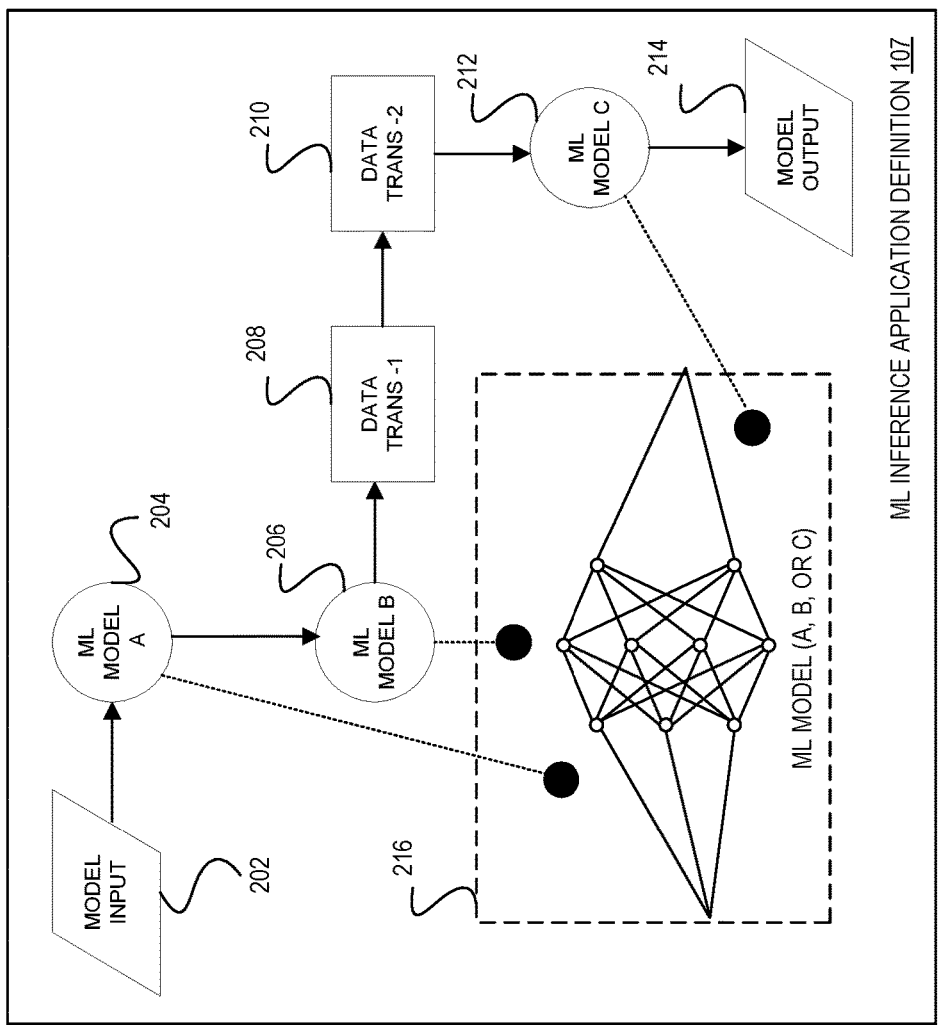
FIG. 2 is an illustration of a ML inference application definition for a ML inference application, according to some embodiments.

FIG. 2 is an illustration of a ML inference application definition for a ML inference application according to some embodiments. The ML inference application definition 107 identifies one or more ML models and one or more data transformation operations to be performed on data to be provided to or generated by the ML models. For instance, in the illustrated example, the ML inference application definition 107 is represented as an inference graph and identifies a ML model A 204, ML model B 206, and ML model C 212 as part of an ML inference application (e.g., 118 shown in FIG. 1). Additionally, the ML inference application definition 107 identifies data transformation operations 208, 210 to be performed on data to be provided to or generated by the ML models 204, 206, and 212. In certain embodiments, the ML inference application definition 107 may also identify pre-processing operations to be performed by the ML models. These pre-processing operations may be provided, for example, as a model input 202 to the ML models. The ML inference application definition 107 may also identify post-processing operations to be performed on output data generated by the ML models to generate the model output 214.

It is to be understood that the ML inference application definition shown in FIG. 2 is only one representation of a ML inference application definition used to implement some embodiments, and various alternate formulations with more or fewer ML models and data transformations in different orderings could alternatively be used and implemented by one of ordinary skill in the art in possession of this disclosure to implement the various embodiments described herein.

In some embodiments, the ML models (e.g., 204, 206, or 214) may be "deep" learning models (e.g., neural networks) 216. Typically, in a neural network, each layer of the model is connected to all nodes of the previous layer and, as such, each layer's output is the subsequent layer's input, starting from an initial input layer that receives data for which inference is to be performed. In some instances, a bias may be connected to all (or any) nodes of the previous layer. Neural networks that have a plurality of hidden layers are commonly referred to as "deep learning" networks. These hidden layers provide the depth of a deep-learning network.

Each of the layers is made up of one or more nodes. A node is a logical point in which computation happens. A node combines input from the data with a set of coefficients, or weights, that either amplify or dampen that input, thereby assigning significance to inputs for the task the algorithm is trying to learn. These input-weight products are subjected to an operation (such as being summed). In some embodiments, each result of the operation passes through an activation function to determine whether, and to what extent, that result progresses further through the model to affect the ultimate outcome.

Nodes of an input layer take in data from an outside source and pass this data to one or more hidden nodes of hidden layers in the neural network. The hidden layer nodes have no direct connection with the outside, perform computations, and transfer information from the input nodes to the output nodes. Generally speaking, adjustable weights can be given to input features throughout the hidden layers that give significance to those features with regard to how the model classifies and/or clusters input. The output layer receives the output of the hidden layers and transfers that output (sometimes with computations) to the outside.

In certain embodiments, the deep learning model 216, shown in FIG. 2 may be itself a symbolic execution graph, and this symbolic execution graph may be augmented by combining it with other graphs/nodes representing other ML models, data transformation operations, pre-processing and/or post-processing operations specified in the ML inference application definition 107 to generate a ML inference application (e.g., 118) which may then be deployed and executed by the ML application orchestration service 114 of FIG. 1.

Figure 3:
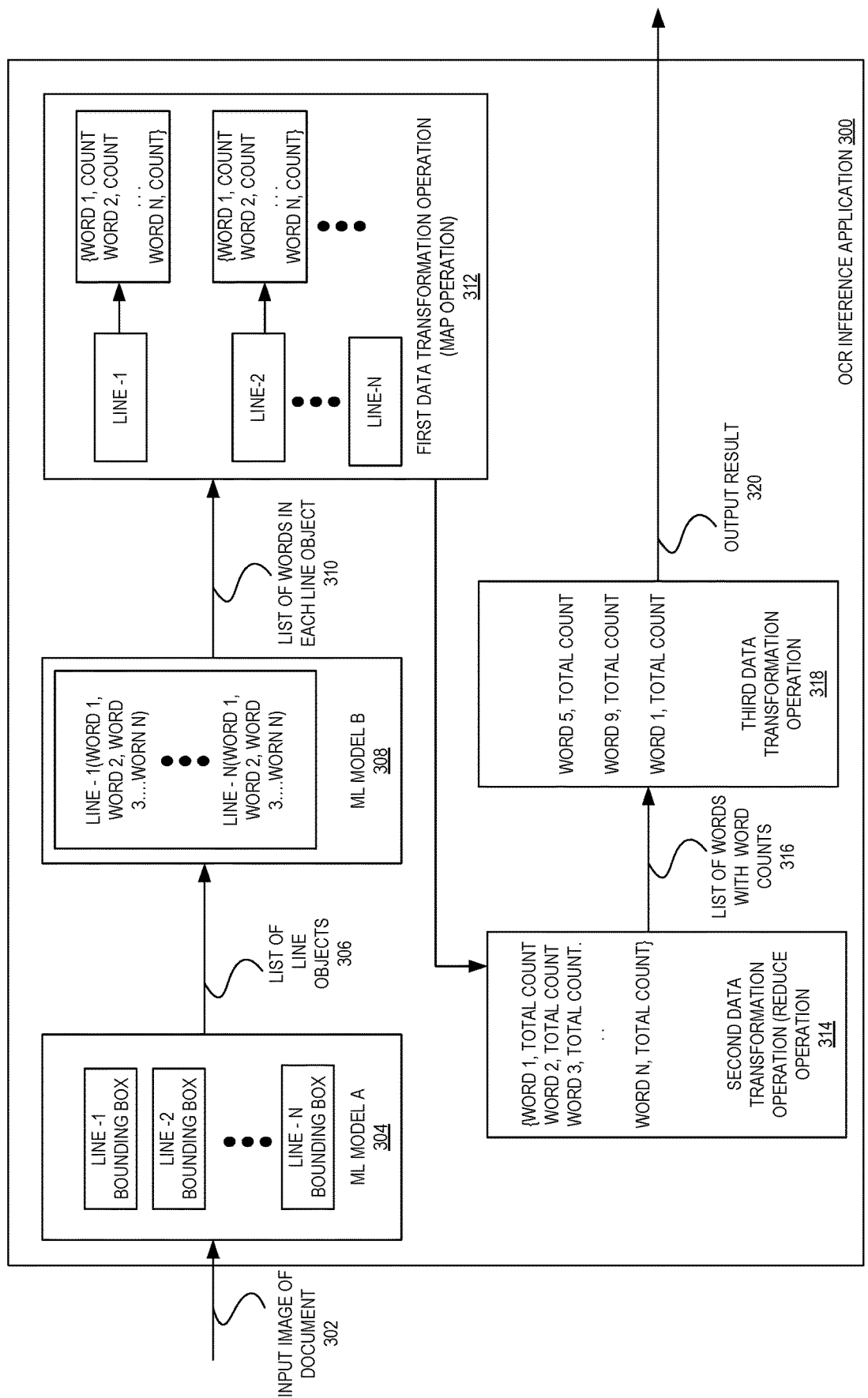
FIG. 3 is an example of an ML inference application deployed by a ML application orchestration service, according to some embodiments.

FIG. 3 is an example of an ML inference application deployed by a ML application orchestration service, according to some embodiments. For instance, a user 102 of the provider network 100 (shown in FIG. 1) may utilize a graph generation tool (e.g., 106) to construct a ML inference application definition (e.g., 107) for an ML inference application and provide this definition to the ML application orchestration service in the provider network. A controller (e.g., 116) in the service may generate a ML inference application (for e.g., 118 in the form of a symbolic execution graph) and provide this to an orchestration agent (e.g., 132) in the service. The orchestration agent may receive the ML inference application from the controller and perform the necessary operations to deploy and execute the ML inference application. For instance, the orchestration agent may identify an order of execution flows (operations) to be performed to deploy the ML inference application based on the ML inference application definition and provision the necessary computing resources to deploy the ML models and the data transformation operations defined in the ML inference application definition.

In the illustrated example, the ML inference application is an Optical Character Recognition (OCR) inference application 300 that counts the number of words in a document and returns the most frequently used words in the document. It is to be understood that the OCR inference application 300 shown in FIG. 3 is only one type of ML inference application that may be generated and deployed by the ML application orchestration service 114. In other embodiments, the ML application orchestration service 114 may implement various alternate formulations with more or fewer ML models and/or data transformations in different orderings for other types of ML inference applications to implement the various embodiments described herein.

In the illustrated example, the OCR inference application 300 comprises a ML model A 304, a ML model B 308, a first data transformation operation 312, a second data transformation 314, and a third data transformation model 318. The orchestration agent may begin by first calling the ML model A 304, which performs line segmentation by taking an input of an image of a document and identifying the locations of each line in the document. For example, the ML model A 304 may generate bounding boxes corresponding to each line of the document. These bounding boxes may identify the coordinates of the locations of each line in the document. The output of the ML model A 304 may include a list of line objects which may be provided to the orchestration agent, which then is provided as an input to ML model B 308 by the orchestration agent. Alternatively, the orchestration agent may use the bounding box information to generate an individual image crop of the image (each representing a line), and send each individual image crop (as a line object)—possibly one at a time—to ML model B. The ML model B 308 may perform the identification of characters (or words) in each line object and output a list of words corresponding to each line object. In certain embodiments, the orchestration agent may optimize the request flow between the models 304 and 308 by enabling the parallel execution of each line object in the list of line objects output by ML model A 304 across different computing instances of the computing node represented by ML model B 308.

The orchestration agent may then execute a first data transformation operation 312 on the data (e.g., list of words corresponding to each line object) output by the ML model B 308. For instance, the orchestration agent may transmit a request to one of the compute instances (e.g., 141) to execute the first data transformation operation 312 (e.g., for each set of words). In one example, the first data transformation operation 312 may correspond to a "map operation" that determines a count of the unique words appearing in each line object. The orchestration agent may then execute a second data transformation operation 314 on the data (i.e., the count of unique words appearing in each line object) output by the first data transformation operation 312. In one example, the second data transformation operation 314 may correspond to a "reduce operation" that determines the total word count for each unique word appearing in the document. In certain embodiments, the orchestration agent may then provide the results (i.e., the total word count for each unique word) generated by the second data transformation operation 314 to a third data transformation operation 318. The third data transformation operation 318 may aggregate the results to provide a customized result for the user. For instance, the third data transformation operation 318 may determine the top 'n' most frequently used words appearing in the output and provide this as an output result 320.

In certain embodiments, a user (e.g., 102) may utilize one of the electronic devices 104 to issue a request to the ML application orchestration service to execute the OCR inference application 300. The service 114 may receive the request at the web service endpoint (e.g., 150) and transmit the request to the orchestration agent. The orchestration agent may transmit a plurality of requests to a plurality of computing resources (e.g., computing resources of the model hosting system 140 that host the ML model(s) 136, the compute instances 141 and/or the on-demand code execution service 146 that host the transformation operations) in the provider network to execute the ML inference application in accordance with the ML inference application definition. The orchestration agent may then obtain a result based on the execution of the OCR inference application 300 and transmit the result (e.g., the top 3 most frequently used words in a document) to the client 108 application on the electronic device.

Figure 4:
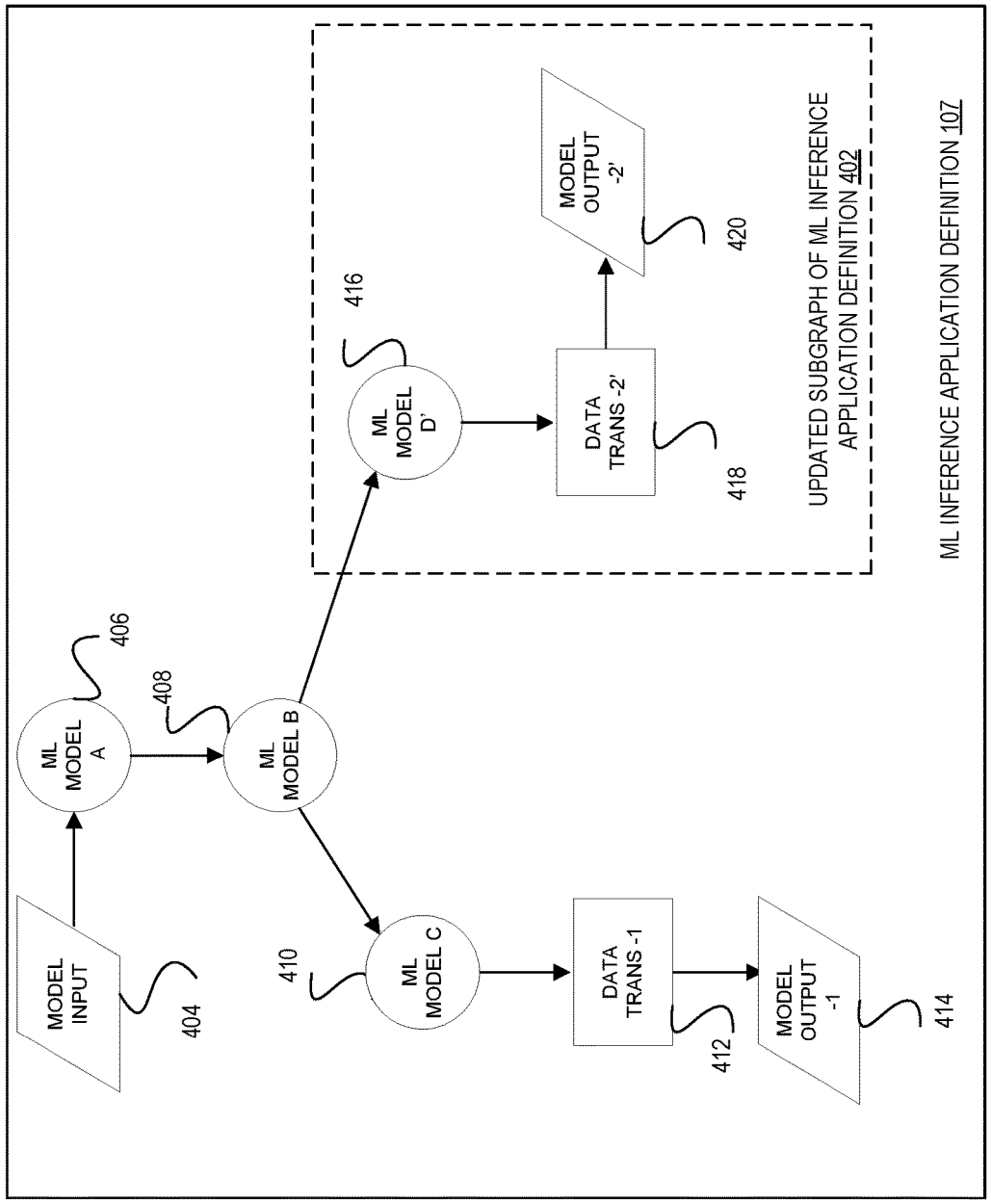
FIG. 4 is an example of an updated subgraph constructed by a ML application orchestration service, according to some embodiments.

FIG. 4 is an example of an updated subgraph constructed by a ML application orchestration service, according to some embodiments. In certain embodiments, a user may update a portion of the ML inference application definition 107 to generate an updated ML inference application definition to be used as part of a ML inference application. For instance, the user may, via a graph generation tool (e.g., 106) of an electronic device (e.g., 104), update a subgraph (i.e., a portion) of the inference graph represented by the ML inference application definition 107 by replacing one or more nodes in the inference graph with one or more updated and/or new nodes. For instance, the user may identify a new/updated ML model to be used as part of defining the ML inference application by selecting the ML model from a model training system (e.g., 120), an ML model library (e.g., 126) of pre-trained models, or a custom model library 128. Similarly, the user may identify a new/updated data transformation operation to be performed on data to be provided to or generated by the ML models (or the new ML model) specified in the ML inference application definition by selecting the data transformation operations from the operations library 131.

For instance, in the illustrated example, the ML inference application definition 107 (represented as an inference graph) identifies a ML model A 406, ML model B 408, and ML model C 410 as part of an ML inference application definition 107. Additionally, the ML inference application definition 107 identifies a data transformation operation 412 to be performed on data to be provided to or generated by the ML model C 410. The ML inference application definition 107 also identifies pre-processing operations to be performed by the ML models. These pre-processing operations may be provided, for example, as a model input 404 to ML model A. The ML inference application definition 107 may further identify post-processing operations to be performed on output data generated by the ML models to generate a model output.

Continuing with our discussion of the illustrated example, the user has changed a portion of the ML inference application definition 107 to generate an updated subgraph 402 for the ML inference application definition 107. The updated subgraph 402 includes a new/updated ML model D' 416. The updated subgraph 402 also includes a new/updated data transformation operation 418 to be performed on data to be provided to or generated by the ML model D' to generate an updated model output 420 for the ML inference application.

In certain embodiments, the controller 116 receives a request to update the inference application based on the updated ML inference application definition generated by the user. For instance, the controller 116 may receive a request from the client 108 of an electronic device to update the inference application. The controller identifies based on the updated ML inference application definition generated by the user, the ML models and data transformation operations to be added or removed from the ML inference application. The controller then communicates an "updated subgraph" to the orchestration agent 132. The orchestration agent 132 provisions one or more computing resources for the new ML model or new data transformation operation and deprovisions one or more computing resources for the previous model or data transformation operation that was part of the ML inference application. The orchestration agent 132 executes an updated ML inference application in accordance with the updated subgraph and obtains a result based on the execution of the updated subgraph. The orchestration agent then transmits the result to the client on the electronic device.

It is to be understood that the ML inference application definition shown in FIG. 4 is only one representation of a ML inference application definition used to implement some embodiments, and various alternate formulations with more or fewer ML models and data transformations in different orderings could alternatively be used and implemented by one of ordinary skill in the art in possession of this disclosure to implement the various embodiments described herein.

Figure 5:
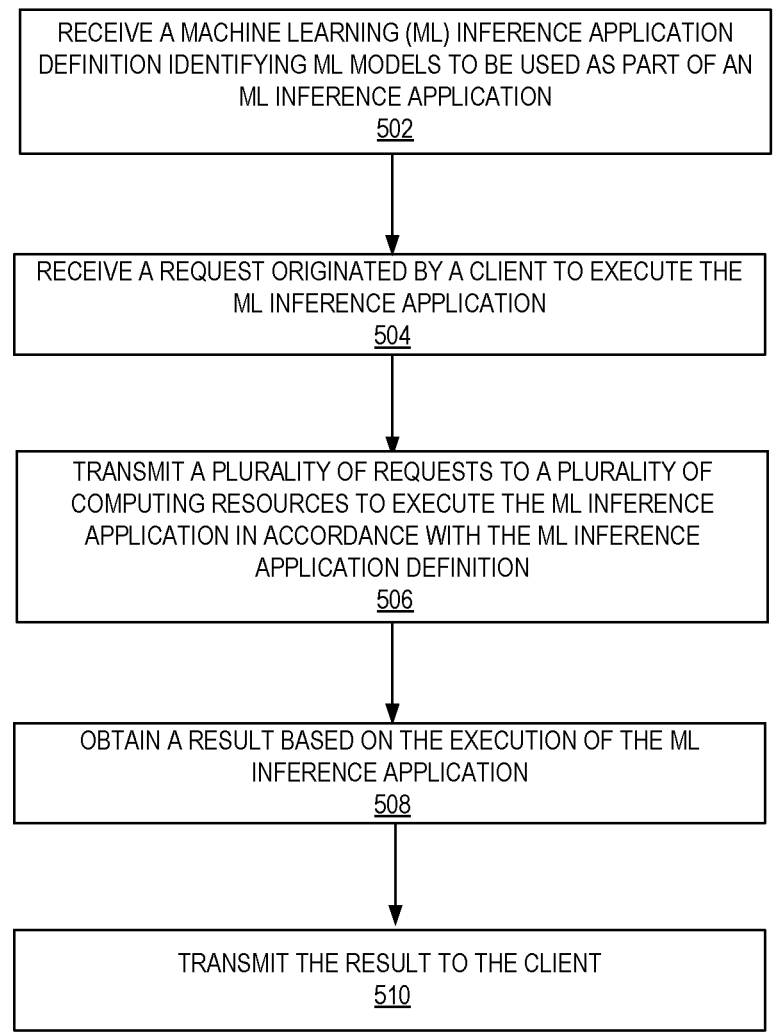
FIG. 5 is a flow diagram illustrating operations of a method for building, orchestrating, and deploying a ML inference application according to some embodiments.

FIG. 5 is a flow diagram illustrating operations 500 of a method for building, orchestrating, and deploying a ML inference application according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by one or more components (controller 116 and orchestration agent 132) of FIG. 1.

The operations 500 include, at block 502, receiving a machine learning (ML) inference application definition identifying one or more ML models to be used as part of an ML inference application. The ML inference application definition may be generated by a user via use of a graphical user interface. For instance, the user may use the graph generation tool 106 (shown in FIG. 1) to generate the ML inference application definition. In some examples, the ML inference application definition may be implemented as an "inference graph" comprising nodes and edges. The nodes may represent ML models and the edges may represent data transformation operations to be performed on data to be provided to or generated by the one or more ML models. In other examples, the ML inference application definition may be implemented as a "text file" using domain specific language (DSL) code for defining the ML models and the data transformation operations to be performed on the ML models.

The operations 500 further include, at block 504, receiving a request originated by a client to execute the ML inference application at an endpoint of the provider network. The operations 500 further include, at block 506, transmitting a plurality of requests to a plurality of computing resources in the provider network to execute the ML inference application in accordance with the ML inference application definition. For instance, an orchestration agent (e.g., 132) in the ML application orchestration inference service can transmit a first request to a model hosting system (e.g., 140) in the provider network to deploy and/or execute the ML models in accordance with the ML inference application definition. The orchestration agent can transmit a second request to one or more computing instances (e.g., 141) implemented by one or more computing devices of the provider network to execute the data transformation operations in accordance with the ML inference application definition.

The operations 500 further include, at block 508, obtaining (e.g., by the orchestration agent) a result based on the execution of the ML inference application. Execution of the ML inference application may result in the generation of outputs (e.g., predicted results) by the ML inference application. The operations 500 further include, at block 510, transmitting, by the orchestration agent, the result to the client. In certain examples, the orchestration agent may transform the result into a format that is suitable for the client prior to transmitting the result to the client.

Figure 6:
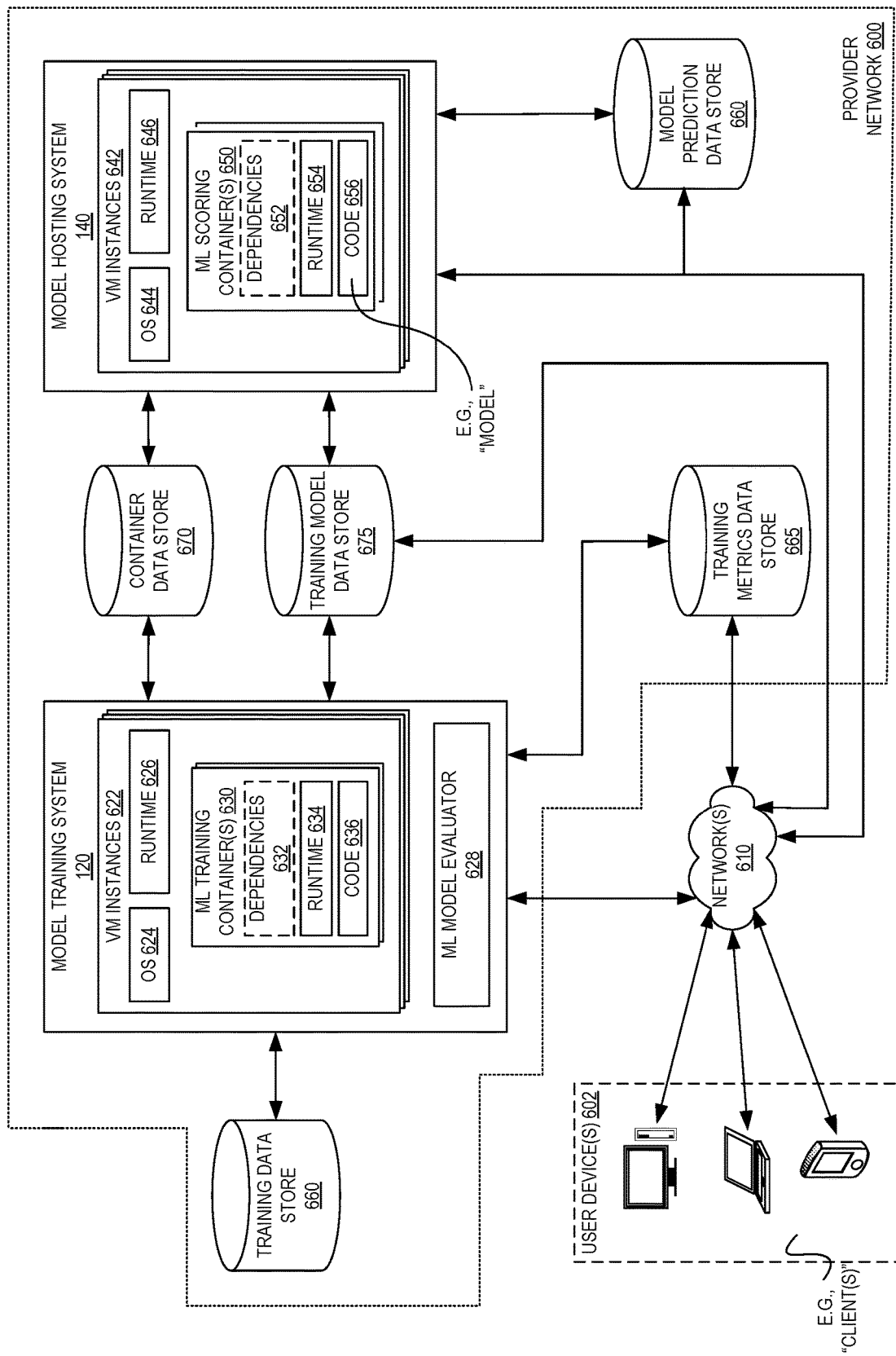
FIG. 6 is a block diagram of an illustrative operating environment in which machine learning models are trained and hosted according to some embodiments.

FIG. 6 is a block diagram of an illustrative operating environment in which machine learning models are trained and hosted according to some embodiments. The operating environment includes end user devices 602, a model training system 120, a model hosting system 140, a training data store 660, a training metrics data store 665, a container data store 670, a training model data store 675, and a model prediction data store 680.

A machine learning service described herein may include one or more of these entities, such as the model hosting system 140, model training system 120, etc.

In some embodiments, users, by way of user devices 602, interact with the model training system 120 to provide data that causes the model training system 120 to train one or more machine learning models. A machine learning model, generally, may be thought of as one or more equations that are "trained" using a set of data. In some embodiments, the model training system 120 provides ML functionalities as a Web service, and thus messaging between user devices 602 and the model training system 120 (or provider network 600), and/or between components of the model training system 120 (or provider network 600), may utilize HTTP messages to transfer data in a machine-readable file format, such as eXtensible Markup Language (XML) or JavaScript Object Notation (JSON).

The user devices 602 can interact with the model training system 120 via frontend 629 of the model training system 120. For example, a user device 602 can provide a training request to the frontend 629 that includes a container image (or multiple container images, or an identifier of one or multiple locations where container images are stored), an indicator of input data (e.g., an address or location of input data), one or more hyperparameter values (e.g., values indicating how the algorithm will operate, how many algorithms to run in parallel, how many clusters into which to separate data, etc.), and/or information describing the computing machine on which to train a machine learning model (e.g., a graphical processing unit (GPU) instance type, a central processing unit (CPU) instance type, an amount of memory to allocate, a type of virtual machine instance to use for training, etc.).

In some embodiments, the container image can include one or more layers, where each layer represents an executable instruction. Some or all of the executable instructions together represent an algorithm that defines a machine learning model. The executable instructions (e.g., the algorithm) can be written in any programming language (e.g., Python, Ruby, C++, Java, etc.). In some embodiments, the algorithm is pre-generated and obtained by a user, via the user device 602, from an algorithm repository (e.g., a network-accessible marketplace, a data store provided by a machine learning training service, etc.). In some embodiments, the algorithm is completely user-generated or partially user-generated (e.g., user-provided code modifies or configures existing algorithmic code).

In some embodiments, instead of providing a container image (or identifier thereof) in the training request, the user device 602 may provide, in the training request, an algorithm written in any programming language. The model training system 120 then packages the algorithm into a container (optionally with other code, such as a "base" ML algorithm supplemented with user-provided code) that is eventually loaded into a virtual machine instance 622 for training a machine learning model, as described in greater detail below. For example, a user, via a user device 602, may develop an algorithm/code using an application (e.g., an interactive web-based programming environment) and cause the algorithm/code to be provided—perhaps as part of a training request (or referenced in a training request)—to the model training system 120, where this algorithm/code may be containerized on its own or used together with an existing container having a machine learning framework, for example.

In some embodiments, instead of providing a container image in the training request, the user device 602 provides, in the training request, an indicator of a container image (e.g., an indication of an address or a location at which a container image is stored). For example, the container image can be stored in a container data store 670, and this container image may have been previously created/uploaded by the user. The model training system 120 can retrieve the container image from the indicated location and create a container using the retrieved container image. The container is then loaded into a virtual machine instance 622 for training a machine learning model, as described in greater detail below.

The model training system 120 can use the information provided by the user device 602 to train a machine learning model in one or more pre-established virtual machine instances 622 in some embodiments. In particular, the model training system 120 includes a single physical computing device or multiple physical computing devices that are interconnected using one or more computing networks (not shown), where the physical computing device(s) host one or more virtual machine instances 622. The model training system 120 can handle the acquisition and configuration of compute capacity (e.g., containers, instances, etc., which are described in greater detail below) based on the information describing the computing machine on which to train a machine learning model provided by the user device 602. The model training system 120 can then train machine learning models using the compute capacity, as is described in greater detail below. The model training system 120 can automatically scale up and down based on the volume of training requests received from user devices 602 via frontend 629, thereby relieving the user from the burden of having to worry about over-utilization (e.g., acquiring too little computing resources and suffering performance issues) or under-utilization (e.g., acquiring more computing resources than necessary to train the machine learning models, and thus overpaying).

In some embodiments, the virtual machine instances 622 are utilized to execute tasks. For example, such tasks can include training a machine learning model. As shown in FIG. 6, each virtual machine instance 622 includes an operating system (OS) 624, a language runtime 626, and one or more ML training containers 630. Generally, the ML training containers 630 are logical units created within a virtual machine instance using the resources available on that instance, and can be utilized to isolate execution of a task from other processes (e.g., task executions) occurring in the instance. In some embodiments, the ML training containers 630 are formed from one or more container images and a top container layer. Each container image may further include one or more image layers, where each image layer represents an executable instruction. As described above, some or all of the executable instructions together represent an algorithm that defines a machine learning model. Changes made to the ML training containers 630 (e.g., creation of new files, modification of existing files, deletion of files, etc.) are stored in the top container layer. If a ML training container 630 is deleted, the top container layer is also deleted. However, the container image(s) that form a portion of the deleted ML training container 630 can remain unchanged. The ML training containers 630 can be implemented, for example, as Linux containers (LXC), Docker containers, and the like.

The ML training containers 630 may include individual a runtime 634, code 636, and dependencies 632 needed by the code 636 in some embodiments. The runtime 634 can be defined by one or more executable instructions that form at least a portion of a container image that is used to form the ML training container 630 (e.g., the executable instruction (s) in the container image that define the operating system and/or runtime to run in the container formed from the container image). The code 636 includes one or more executable instructions that form at least a portion of a container image that is used to form the ML training container 630. For example, the code 636 includes the executable instructions in the container image that represent an algorithm that defines a machine learning model, which may reference (or utilize) code or libraries from dependencies 632. The runtime 634 is configured to execute the code 636 in response to an instruction to begin machine learning model training. Execution of the code 636 results in the generation of model data, as described in greater detail below.

In some embodiments, the code 636 includes executable instructions that represent algorithms that define different machine learning models. For example, the code 636 includes one set of executable instructions that represent a first algorithm that defines a first machine learning model and a second set of executable instructions that represent a second algorithm that defines a second machine learning model. In some embodiments, the virtual machine instance 622 executes the code 636 and trains all of the machine learning models. In some embodiments, the virtual machine instance 622 executes the code 636, selecting one of the machine learning models to train. For example, the virtual machine instance 622 can identify a type of training data indicated by the training request and select a machine learning model to train (e.g., execute the executable instructions that represent an algorithm that defines the selected machine learning model) that corresponds with the identified type of training data.

In some embodiments, the runtime 634 is the same as the runtime 626 utilized by the virtual machine instance 622. In some embodiments, the runtime 634 is different than the runtime 626 utilized by the virtual machine instance 622.

In some embodiments, the model training system 120 uses one or more container images included in a training request (or a container image retrieved from the container data store 670 in response to a received training request) to create and initialize a ML training container 630 in a virtual machine instance 622. For example, the model training system 120 creates a ML training container 630 that includes the container image(s) and/or a top container layer.

Prior to beginning the training process, in some embodiments, the model training system 120 retrieves training data from the location indicated in the training request. For example, the location indicated in the training request can be a location in the training data store 660. Thus, the model training system 120 retrieves the training data from the indicated location in the training data store 660. In some embodiments, the model training system 120 does not retrieve the training data prior to beginning the training process. Rather, the model training system 120 streams the training data from the indicated location during the training process. For example, the model training system 120 can initially retrieve a portion of the training data and provide the retrieved portion to the virtual machine instance 622 training the machine learning model. Once the virtual machine instance 622 has applied and used the retrieved portion or once the virtual machine instance 622 is about to use all of the retrieved portion (e.g., a buffer storing the retrieved portion is nearly empty), then the model training system 120 can retrieve a second portion of the training data and provide the second retrieved portion to the virtual machine instance 622, and so on.

To perform the machine learning model training, the virtual machine instance 622 executes code 636 stored in the ML training container 630 in some embodiments. For example, the code 636 includes some or all of the executable instructions that form the container image of the ML training container 630 initialized therein. Thus, the virtual machine instance 622 executes some or all of the executable instructions that form the container image of the ML training container 630 initialized therein to train a machine learning model. The virtual machine instance 622 executes some or all of the executable instructions according to the hyperparameter values included in the training request. As an illustrative example, the virtual machine instance 622 trains a machine learning model by identifying values for certain parameters (e.g., coefficients, weights, centroids, etc.). The identified values depend on hyperparameters that define how the training is performed. Thus, the virtual machine instance 622 can execute the executable instructions to initiate a machine learning model training process, where the training process is run using the hyperparameter values included in the training request. Execution of the executable instructions can include the virtual machine instance 622 applying the training data retrieved by the model training system 120 as input parameters to some or all of the instructions being executed.

In some embodiments, executing the executable instructions causes the virtual machine instance 622 (e.g., the ML training container 630) to generate model data. For example, the ML training container 630 generates model data and stores the model data in a file system of the ML training container 630. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 630 such that the model data is written to the top container layer of the ML training container 630 and/or the container image(s) that forms a portion of the ML training container 630 is modified to include the model data.

The virtual machine instance 622 (or the model training system 120 itself) pulls the generated model data from the ML training container 630 and stores the generated model data in the training model data store 675 in an entry associated with the virtual machine instance 622 and/or the machine learning model being trained. In some embodiments, the virtual machine instance 622 generates a single file that includes model data and stores the single file in the training model data store 675. In some embodiments, the virtual machine instance 622 generates multiple files during the course of training a machine learning model, where each file includes model data. In some embodiments, each model data file includes the same or different model data information (e.g., one file identifies the structure of an algorithm, another file includes a list of coefficients, etc.). The virtual machine instance 622 can package the multiple files into a single file once training is complete and store the single file in the training model data store 675. Alternatively, the virtual machine instance 622 stores the multiple files in the training model data store 675. The virtual machine instance 622 stores the file(s) in the training model data store 675 while the training process is ongoing and/or after the training process is complete.

In some embodiments, the virtual machine instance 622 regularly stores model data file(s) in the training model data store 675 as the training process is ongoing. Thus, model data file(s) can be stored in the training model data store 675 at different times during the training process. Each set of model data files corresponding to a particular time or each set of model data files present in the training model data store 675 as of a particular time could be checkpoints that represent different versions of a partially-trained machine learning model during different stages of the training process. Accordingly, before training is complete, a user, via the user device 602 can submit a deployment and/or execution request in a manner as described below to deploy and/or execute a version of a partially trained machine learning model (e.g., a machine learning model trained as of a certain stage in the training process). A version of a partially-trained machine learning model can be based on some or all of the model data files stored in the training model data store 675.

In some embodiments, a virtual machine instance 622 executes code 636 stored in a plurality of ML training containers 630. For example, the algorithm included in the container image can be in a format that allows for the parallelization of the training process. Thus, the model training system 120 can create multiple copies of the container image provided in a training request and cause the virtual machine instance 622 to load each container image copy in a separate ML training container 630. The virtual machine instance 622 can then execute, in parallel, the code 636 stored in the ML training containers 630. The virtual machine instance 622 can further provide configuration information to each ML training container 630 (e.g., information indicating that N ML training containers 630 are collectively training a machine learning model and that a particular ML training container 630 receiving the configuration information is ML training container 630 number X of N), which can be included in the resulting model data. By parallelizing the training process, the model training system 120 can significantly reduce the training time in some embodiments.

In some embodiments, a plurality of virtual machine instances 622 execute code 636 stored in a plurality of ML training containers 630. For example, the resources used to train a particular machine learning model can exceed the limitations of a single virtual machine instance 622. However, the algorithm included in the container image can be in a format that allows for the parallelization of the training process. Thus, the model training system 120 can create multiple copies of the container image provided in a training request, initialize multiple virtual machine instances 622, and cause each virtual machine instance 622 to load a container image copy in one or more separate ML training containers 630. The virtual machine instances 622 can then each execute the code 636 stored in the ML training containers 630 in parallel. The model training system 120 can further provide configuration information to each ML training container 630 via the virtual machine instances 622 (e.g., information indicating that N ML training containers 630 are collectively training a machine learning model and that a particular ML training container 630 receiving the configuration information is ML training container 630 number X of N, information indicating that M virtual machine instances 622 are collectively training a machine learning model and that a particular ML training container 630 receiving the configuration information is initialized in virtual machine instance 622 number Y of M, etc.), which can be included in the resulting model data. As described above, by parallelizing the training process, the model training system 120 can significantly reduce the training time in some embodiments.

In some embodiments, the model training system 120 includes a plurality of physical computing devices and two or more of the physical computing devices hosts one or more virtual machine instances 622 that execute the code 636. Thus, the parallelization can occur over different physical computing devices in addition to over different virtual machine instances 622 and/or ML training containers 630.

In some embodiments, the model training system 120 includes a ML model evaluator 628. The ML model evaluator 628 can monitor virtual machine instances 622 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (e.g., a level of confidence that the accuracy of the machine learning model being trained is known, etc. The ML model evaluator 628 can obtain the model data for a machine learning model being trained and evaluation data from the training data store 660. The evaluation data is separate from the data used to train a machine learning model and includes both input data and expected outputs (e.g., known results), and thus the ML model evaluator 628 can define a machine learning model using the model data and execute the machine learning model by providing the input data as inputs to the machine learning model. The ML model evaluator 628 can then compare the outputs of the machine learning model to the expected outputs, and determine one or more quality metrics of the machine learning model being trained based on the comparison (e.g., the error rate can be a difference or distance between the machine learning model outputs and the expected outputs).

The ML model evaluator 628 periodically generates model metrics during the training process and stores the model metrics in the training metrics data store 665 in some embodiments. While the machine learning model is being trained, a user, via the user device 602, can access and retrieve the model metrics from the training metrics data store 665. The user can then use the model metrics to determine whether to adjust the training process and/or to stop the training process. For example, the model metrics can indicate that the machine learning model is performing poorly (e.g., has an error rate above a threshold value, has a statistical distribution that is not an expected or desired distribution (e.g., not a binomial distribution, a Poisson distribution, a geometric distribution, a normal distribution, Gaussian distribution, etc.), has an execution latency above a threshold value, has a confidence level below a threshold value)) and/or is performing progressively worse (e.g., the quality metric continues to worsen over time). In response, in some embodiments, the user, via the user device 602, can transmit a request to the model training system 120 to modify the machine learning model being trained (e.g., transmit a modification request). The request can include a new or modified container image, a new or modified algorithm, new or modified hyperparameter(s), and/or new or modified information describing the computing machine on which to train a machine learning model. The model training system 120 can modify the machine learning model accordingly. For example, the model training system 120 can cause the virtual machine instance 622 to optionally delete an existing ML training container 630, create and initialize a new ML training container 630 using some or all of the information included in the request, and execute the code 636 stored in the new ML training container 630 to restart the machine learning model training process. As another example, the model training system 120 can cause the virtual machine instance 622 to modify the execution of code stored in an existing ML training container 630 according to the data provided in the modification request. In some embodiments, the user, via the user device 602, can transmit a request to the model training system 120 to stop the machine learning model training process. The model training system 120 can then instruct the virtual machine instance 622 to delete the ML training container 630 and/or to delete any model data stored in the training model data store 675.

As described below, in some embodiments, the model data stored in the training model data store 675 is used by the model hosting system 140 to deploy machine learning models. Alternatively or in addition, a user device 602 or another computing device (not shown) can retrieve the model data from the training model data store 675 to implement a learning algorithm in an external device. As an illustrative example, a robotic device can include sensors to capture input data. A user device 602 can retrieve the model data from the training model data store 675 and store the model data in the robotic device. The model data defines a machine learning model. Thus, the robotic device can provide the captured input data as an input to the machine learning model, resulting in an output. The robotic device can then perform an action (e.g., move forward, raise an arm, generate a sound, etc.) based on the resulting output.

While the virtual machine instances 622 are shown in FIG. 6 as a single grouping of virtual machine instances 622, some embodiments of the present application separate virtual machine instances 622 that are actively assigned to execute tasks from those virtual machine instances 622 that are not actively assigned to execute tasks. For example, those virtual machine instances 622 actively assigned to execute tasks are grouped into an "active pool," while those virtual machine instances 622 not actively assigned to execute tasks are placed within a "warming pool." In some embodiments, those virtual machine instances 622 within the warming pool can be pre-initialized with an operating system, language runtimes, and/or other software required to enable rapid execution of tasks (e.g., rapid initialization of machine learning model training in ML training container(s) 630) in response to training requests.

In some embodiments, the model training system 120 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 602, the model hosting system 140, etc.). The processing unit can also communicate to and from a memory of a virtual machine instance 622 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 140 includes a single physical computing device or multiple physical computing devices that are interconnected using one or more computing networks (not shown), where the physical computing device(s) host one or more virtual machine instances 642. The model hosting system 140 can handle the acquisition and configuration of compute capacity (e.g., containers, instances, etc.) based on demand for the execution of trained machine learning models. The model hosting system 140 can then execute machine learning models using the compute capacity, as is described in greater detail below. The model hosting system 140 can automatically scale up and down based on the volume of execution requests received from user devices 602 via frontend 649 of the model hosting system 140, thereby relieving the user from the burden of having to worry about over-utilization (e.g., acquiring too little computing resources and suffering performance issues) or under-utilization (e.g., acquiring more computing resources than necessary to run the machine learning models, and thus overpaying).

In some embodiments, the virtual machine instances 642 are utilized to execute tasks. For example, such tasks can include executing a machine learning model. As shown in FIG. 6, each virtual machine instance 642 includes an operating system (OS) 644, a language runtime 646, and one or more ML scoring containers 650. The ML scoring containers 650 are similar to the ML training containers 630 in that the ML scoring containers 650 are logical units created within a virtual machine instance using the resources available on that instance, and can be utilized to isolate execution of a task from other processes (e.g., task executions) occurring in the instance. In some embodiments, the ML scoring containers 650 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 650 (e.g., creation of new files, modification of existing files, deletion of files, etc.) are stored in the top container layer. If a ML scoring container 650 is deleted, the top container layer is also deleted. However, the container image(s) that form a portion of the deleted ML scoring container 650 can remain unchanged. The ML scoring containers 650 can be implemented, for example, as Linux containers.

The ML scoring containers 650 each include a runtime 654, code 656, and dependencies 652 (e.g., supporting software such as libraries) needed by the code 656 in some embodiments. The runtime 654 can be defined by one or more executable instructions that form at least a portion of a container image that is used to form the ML scoring container 650 (e.g., the executable instruction(s) in the container image that define the operating system and/or runtime to run in the container formed from the container image). The code 656 includes one or more executable instructions that form at least a portion of a container image that is used to form the ML scoring container 650. For example, the code 656 includes the executable instructions in the container image that represent an algorithm that defines a machine learning model, which may reference dependencies 652. The code 656 can also include model data that represent characteristics of the defined machine learning model, as described in greater detail below. The runtime 654 is configured to execute the code 656 in response to an instruction to begin execution of a machine learning model. Execution of the code 656 results in the generation of outputs (e.g., predicted results), as described in greater detail below.

In some embodiments, the runtime 654 is the same as the runtime 646 utilized by the virtual machine instance 642. In some embodiments, runtime 654 is different than the runtime 646 utilized by the virtual machine instance 642.

In some embodiments, the model hosting system 140 uses one or more container images included in a deployment request (or a container image retrieved from the container data store 670 in response to a received deployment request) to create and initialize a ML scoring container 650 in a virtual machine instance 642. For example, the model hosting system 140 creates a ML scoring container 650 that includes the container image(s) and/or a top container layer.

As described above, a user device 602 can submit a deployment request and/or an execution request to the model hosting system 140 via the frontend 649 in some embodiments. A deployment request causes the model hosting system 140 to deploy a trained machine learning model into a virtual machine instance 642. For example, the deployment request can include an identification of an endpoint (e.g., an endpoint name, such as an HTTP endpoint name) and an identification of one or more trained machine learning models (e.g., a location of one or more model data files stored in the training model data store 675). Optionally, the deployment request also includes an identification of one or more container images stored in the container data store 670.

Upon receiving the deployment request, the model hosting system 140 initializes ones or more ML scoring containers 650 in one or more hosted virtual machine instance 642. In embodiments in which the deployment request includes an identification of one or more container images, the model hosting system 140 forms the ML scoring container(s) 650 from the identified container image(s). For example, a container image identified in a deployment request can be the same container image used to form an ML training container 630 used to train the machine learning model corresponding to the deployment request. Thus, the code 656 of the ML scoring container(s) 650 includes one or more executable instructions in the container image(s) that represent an algorithm that defines a machine learning model. In embodiments in which the deployment request does not include an identification of a container image, the model hosting system 140 forms the ML scoring container(s) 650 from one or more container images stored in the container data store 670 that are appropriate for executing the identified trained machine learning model(s). For example, an appropriate container image can be a container image that includes executable instructions that represent an algorithm that defines the identified trained machine learning model(s).

The model hosting system 140 further forms the ML scoring container(s) 650 by retrieving model data corresponding to the identified trained machine learning model(s) in some embodiments. For example, the deployment request can identify a location of model data file(s) stored in the training model data store 675. In embodiments in which a single model data file is identified in the deployment request, the model hosting system 140 retrieves the identified model data file from the training model data store 675 and inserts the model data file into a single ML scoring container 650, which forms a portion of code 656. In some embodiments, the model data file is archived or compressed (e.g., formed from a package of individual files). Thus, the model hosting system 140 unarchives or decompresses the model data file to obtain multiple individual files, and inserts the individual files into the ML scoring container 650. In some embodiments, the model hosting system 140 stores the model data file in the same location as the location in which the model data file was stored in the ML training container 630 that generated the model data file. For example, the model data file initially was stored in the top container layer of the ML training container 630 at a certain offset, and the model hosting system 140 then stores the model data file in the top container layer of the ML scoring container 650 at the same offset.

In embodiments in which multiple model data files are identified in the deployment request, the model hosting system 140 retrieves the identified model data files from the training model data store 675. The model hosting system 140 can insert the model data files into the same ML scoring container 650, into different ML scoring containers 650 initialized in the same virtual machine instance 642, or into different ML scoring containers 650 initialized in different virtual machine instances 642. As an illustrative example, the deployment request can identify multiple model data files corresponding to different trained machine learning models because the trained machine learning models are related (e.g., the output of one trained machine learning model is used as an input to another trained machine learning model). Thus, the user may desire to deploy multiple machine learning models to eventually receive a single output that relies on the outputs of multiple machine learning models.

In some embodiments, the model hosting system 140 associates the initialized ML scoring container(s) 650 with the endpoint identified in the deployment request. For example, each of the initialized ML scoring container(s) 650 can be associated with a network address. The model hosting system 140 can map the network address(es) to the identified endpoint, and the model hosting system 140 or another system (e.g., a routing system, not shown) can store the mapping. Thus, a user device 602 can refer to trained machine learning model(s) stored in the ML scoring container(s) 650 using the endpoint. This allows for the network address of an ML scoring container 650 to change without causing the user operating the user device 602 to change the way in which the user refers to a trained machine learning model.

Once the ML scoring container(s) 650 are initialized, the ML scoring container(s) 650 are ready to execute trained machine learning model(s). In some embodiments, the user device 602 transmits an execution request to the model hosting system 140 via the frontend 649, where the execution request identifies an endpoint and includes an input to a machine learning model (e.g., a set of input data). The model hosting system 140 or another system (e.g., a routing system, not shown) can obtain the execution request, identify the ML scoring container(s) 650 corresponding to the identified endpoint, and route the input to the identified ML scoring container(s) 650.

In some embodiments, a virtual machine instance 642 executes the code 656 stored in an identified ML scoring container 650 in response to the model hosting system 140 receiving the execution request. In particular, execution of the code 656 causes the executable instructions in the code 656 corresponding to the algorithm to read the model data file stored in the ML scoring container 650, use the input included in the execution request as an input parameter, and generate a corresponding output. As an illustrative example, the algorithm can include coefficients, weights, layers, cluster centroids, and/or the like. The executable instructions in the code 656 corresponding to the algorithm can read the model data file to determine values for the coefficients, weights, layers, cluster centroids, and/or the like. The executable instructions can include input parameters, and the input included in the execution request can be supplied by the virtual machine instance 642 as the input parameters. With the machine learning model characteristics and the input parameters provided, execution of the executable instructions by the virtual machine instance 642 can be completed, resulting in an output.

In some embodiments, the virtual machine instance 642 stores the output in the model prediction data store 680. Alternatively or in addition, the virtual machine instance 642 transmits the output to the user device 602 that submitted the execution result via the frontend 649.

In some embodiments, the execution request corresponds to a group of related trained machine learning models. Thus, the ML scoring container 650 can transmit the output to a second ML scoring container 650 initialized in the same virtual machine instance 642 or in a different virtual machine instance 642. The virtual machine instance 642 that initialized the second ML scoring container 650 can then execute second code 656 stored in the second ML scoring container 650, providing the received output as an input parameter to the executable instructions in the second code 656. The second ML scoring container 650 further includes a model data file stored therein, which is read by the executable instructions in the second code 656 to determine values for the characteristics defining the machine learning model. Execution of the second code 656 results in a second output. The virtual machine instance 642 that initialized the second ML scoring container 650 can then transmit the second output to the model prediction data store 680 and/or the user device 602 via the frontend 649 (e.g., if no more trained machine learning models are needed to generate an output) or transmit the second output to a third ML scoring container 650 initialized in the same or different virtual machine instance 642 (e.g., if outputs from one or more additional trained machine learning models are needed), and the above-referenced process can be repeated with respect to the third ML scoring container 650.

While the virtual machine instances 642 are shown in FIG. 6 as a single grouping of virtual machine instances 642, some embodiments of the present application separate virtual machine instances 642 that are actively assigned to execute tasks from those virtual machine instances 642 that are not actively assigned to execute tasks. For example, those virtual machine instances 642 actively assigned to execute tasks are grouped into an "active pool," while those virtual machine instances 642 not actively assigned to execute tasks are placed within a "warming pool." In some embodiments, those virtual machine instances 642 within the warming pool can be pre-initialized with an operating system, language runtimes, and/or other software required to enable rapid execution of tasks (e.g., rapid initialization of ML scoring container(s) 650, rapid execution of code 656 in ML scoring container(s), etc.) in response to deployment and/or execution requests.

In some embodiments, the model hosting system 140 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 602, the model training system 120, etc.). The processing unit can also communicate to and from a memory of a virtual machine instance 642 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi-arm bandit models, reinforcement learning models, ensemble machine learning models, deep learning models, and the like.

The model training system 120 and the model hosting system 140 depicted in FIG. 6 are not meant to be limiting. For example, the model training system 120 and/or the model hosting system 140 could also operate within a computing environment having a fewer or greater number of devices than are illustrated in FIG. 6. Thus, the depiction of the model training system 120 and/or the model hosting system 140 in FIG. 6 may be taken as illustrative and not limiting to the present disclosure. For example, the model training system 120 and/or the model hosting system 140 or various constituents thereof could implement various Web services components, hosted or "cloud" computing environments, and/or peer-to-peer network configurations to implement at least a portion of the processes described herein. In some embodiments, the model training system 120 and/or the model hosting system 140 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 629 processes all training requests received from user devices 602 and provisions virtual machine instances 622. In some embodiments, the frontend 629 serves as a front door to all the other services provided by the model training system 120. The frontend 629 processes the requests and makes sure that the requests are properly authorized. For example, the frontend 629 may determine whether the user associated with the training request is authorized to initiate the training process.

Similarly, frontend 649 processes all deployment and execution requests received from user devices 602 and provisions virtual machine instances 642. In some embodiments, the frontend 649 serves as a front door to all the other services provided by the model hosting system 140. The frontend 649 processes the requests and makes sure that the requests are properly authorized. For example, the frontend 649 may determine whether the user associated with a deployment request or an execution request is authorized to access the indicated model data and/or to execute the indicated machine learning model.

The training data store 660 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 660 is depicted as being located external to the model training system 120 and the model hosting system 140, this is not meant to be limiting. For example, in some embodiments not shown, the training data store 660 is located internal to at least one of the model training system 120 or the model hosting system 140.

In some embodiments, the training metrics data store 665 stores model metrics. While the training metrics data store 665 is depicted as being located external to the model training system 120 and the model hosting system 140, this is not meant to be limiting. For example, in some embodiments not shown, the training metrics data store 665 is located internal to at least one of the model training system 120 or the model hosting system 140.

The container data store 670 stores container images, such as container images used to form ML training containers 630 and/or ML scoring containers 650, that can be retrieved by various virtual machine instances 622 and/or 642. While the container data store 670 is depicted as being located external to the model training system 120 and the model hosting system 140, this is not meant to be limiting. For example, in some embodiments not shown, the container data store 670 is located internal to at least one of the model training system 120 and the model hosting system 140.

The training model data store 675 stores model data files. In some embodiments, some of the model data files are comprised of a single file, while other model data files are packages of multiple individual files. While the training model data store 675 is depicted as being located external to the model training system 120 and the model hosting system 140, this is not meant to be limiting. For example, in some embodiments not shown, the training model data store 675 is located internal to at least one of the model training system 120 or the model hosting system 140.

The model prediction data store 680 stores outputs (e.g., execution results) generated by the ML scoring containers 650 in some embodiments. While the model prediction data store 680 is depicted as being located external to the model training system 120 and the model hosting system 140, this is not meant to be limiting. For example, in some embodiments not shown, the model prediction data store 680 is located internal to at least one of the model training system 120 and the model hosting system 140.

While the model training system 120, the model hosting system 140, the training data store 660, the training metrics data store 665, the container data store 670, the training model data store 675, and the model prediction data store 680 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (e.g., also referred to herein as a machine learning service) can communicate with one or more of the user devices 602 via the network 610.

Various example user devices 602 are shown in FIG. 6, including a desktop computer, laptop, and a mobile phone, each provided by way of illustration. In general, the user devices 602 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 120 and/or the model hosting system 140 provides the user devices 602 with one or more user interfaces, command-line interfaces (CLI), application programming interfaces (API), and/or other programmatic interfaces for submitting training requests, deployment requests, and/or execution requests. In some embodiments, the user devices 602 can execute a stand-alone application that interacts with the model training system 120 and/or the model hosting system 140 for submitting training requests, deployment requests, and/or execution requests.

In some embodiments, the network 610 includes any wired network, wireless network, or combination thereof. For example, the network 610 may be a personal area network, local area network, wide area network, over-the-air broadcast network (e.g., for radio or television), cable network, satellite network, cellular telephone network, or combination thereof. As a further example, the network 610 may be a publicly accessible network of linked networks, possibly operated by various distinct parties, such as the Internet. In some embodiments, the network 610 may be a private or semi-private network, such as a corporate or university intranet. The network 610 may include one or more wireless networks, such as a Global System for Mobile Communications (GSM) network, a Code Division Multiple Access (CDMA) network, a Long Term Evolution (LTE) network, or any other type of wireless network. The network 610 can use protocols and components for communicating via the Internet or any of the other aforementioned types of networks. For example, the protocols used by the network 610 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 7:
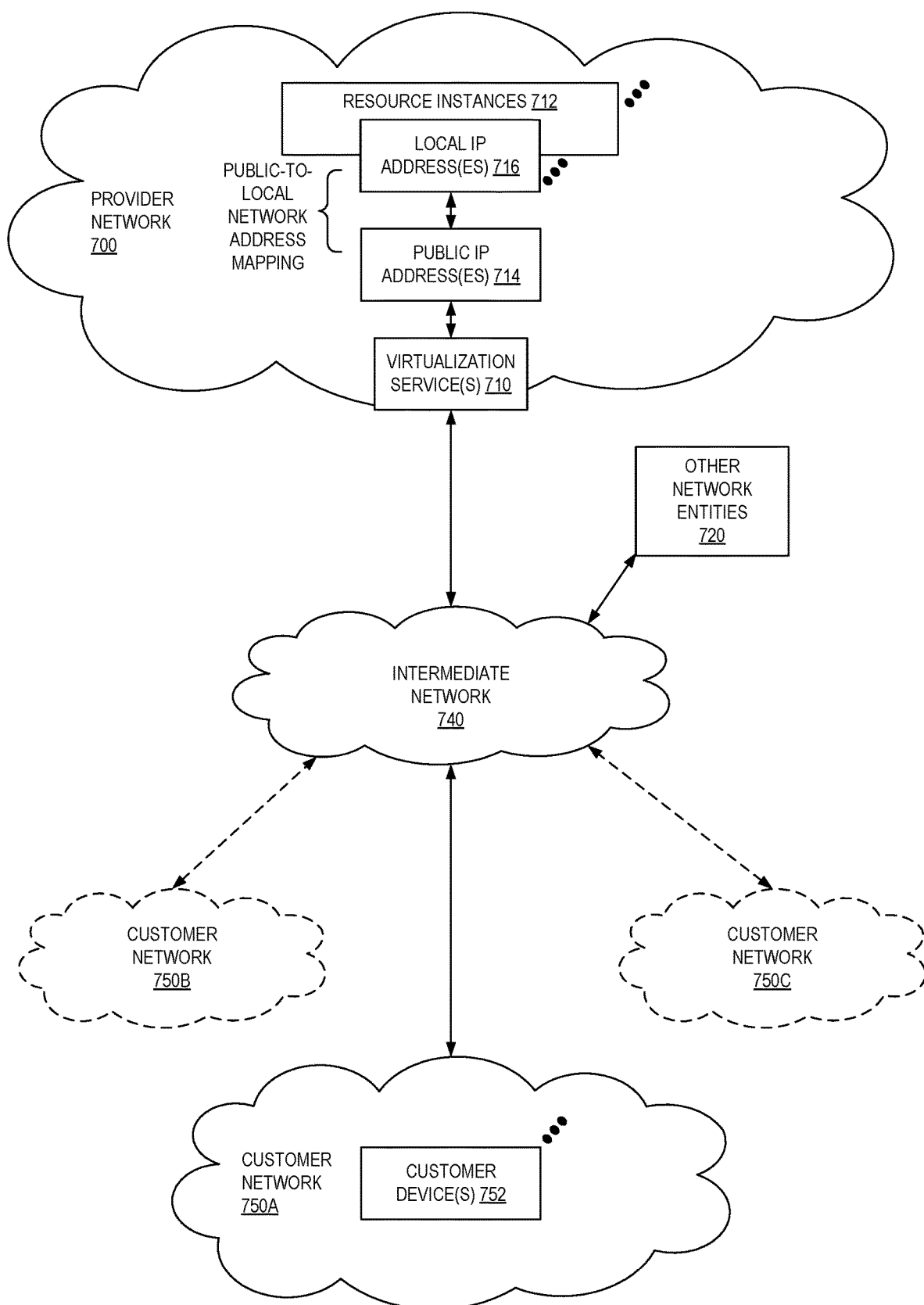
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
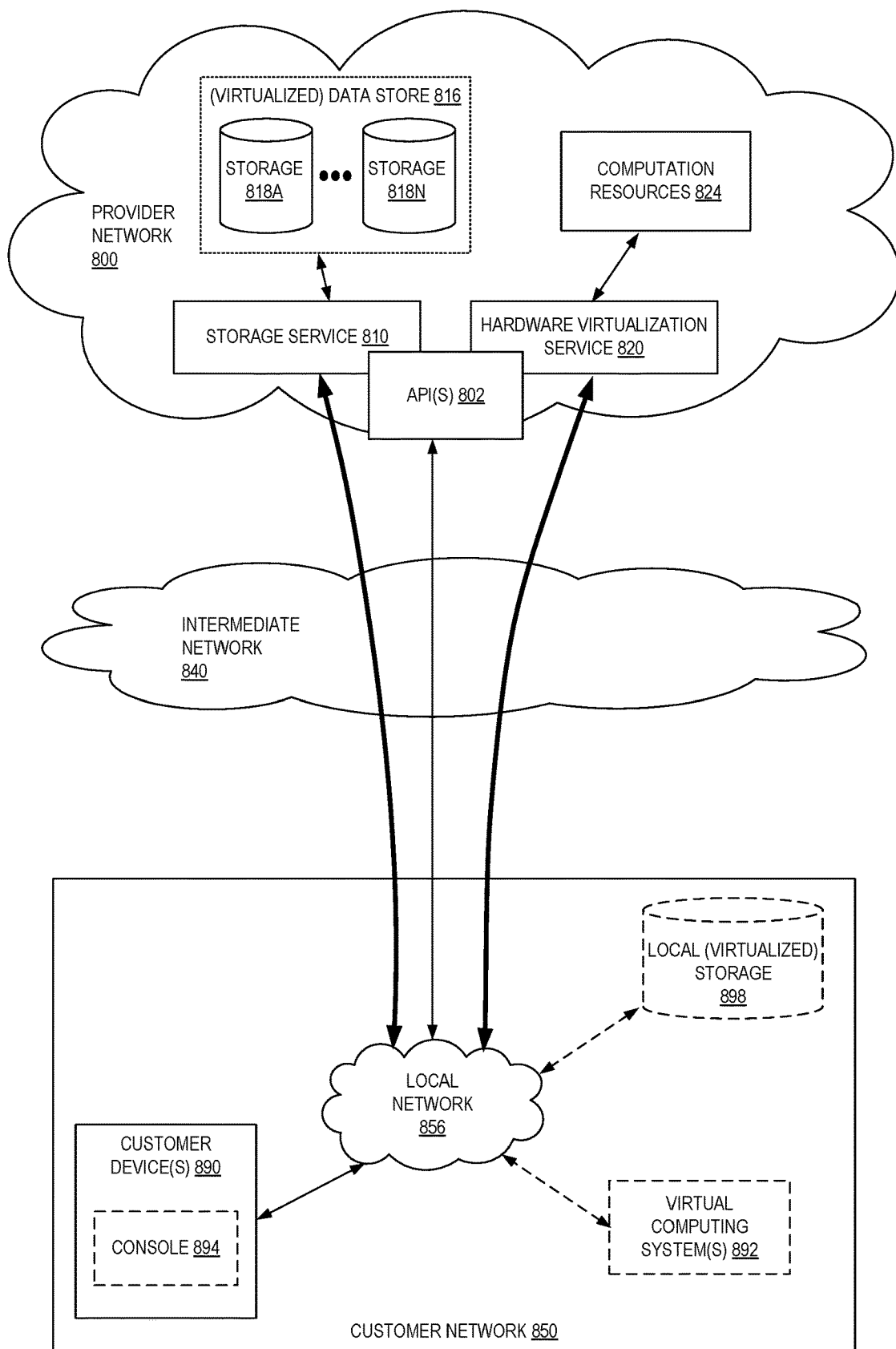
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
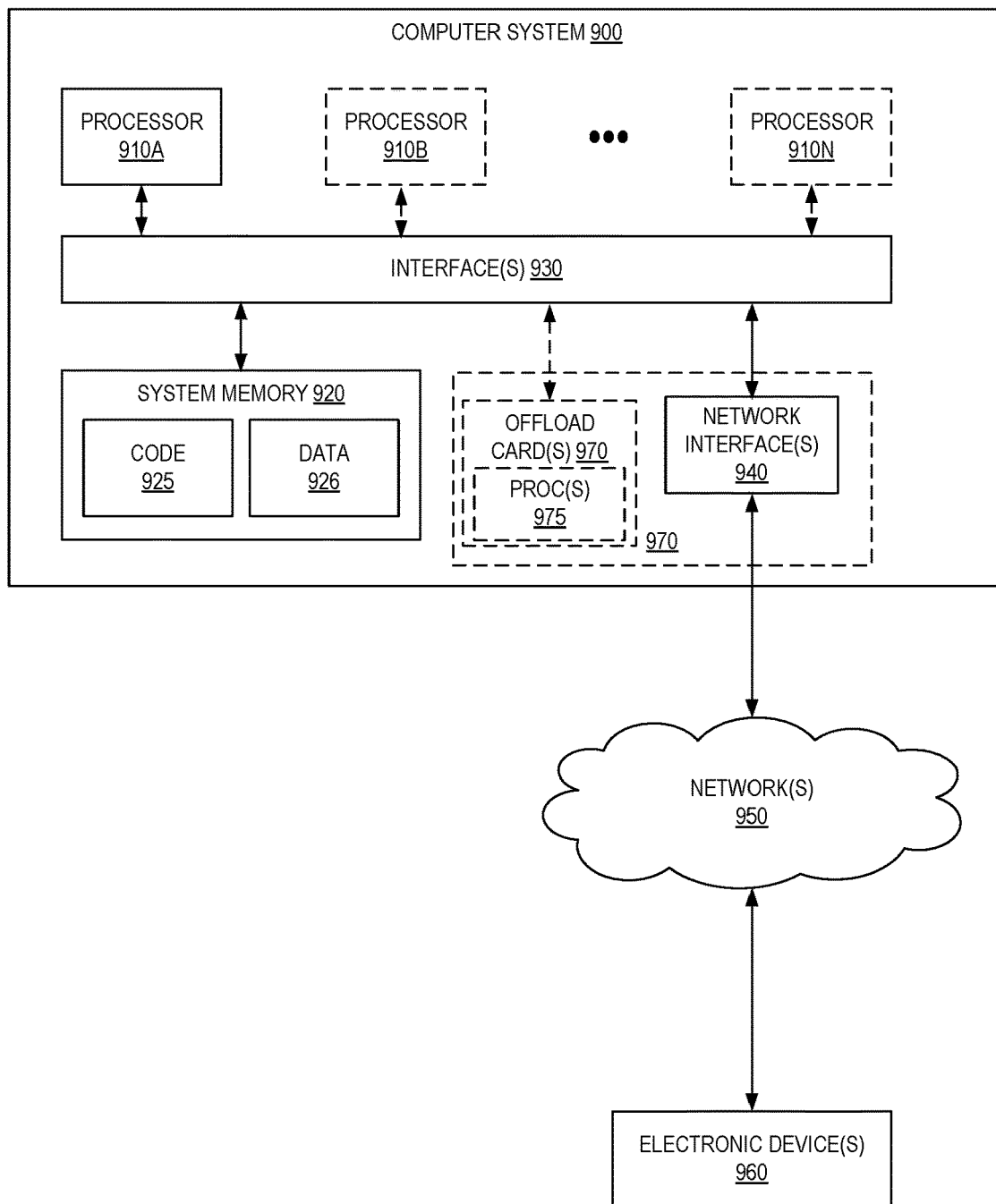
FIG. 9 is a block diagram illustrating an example computer system that may be used in some embodiments.

In some embodiments, a system that implements a portion or all of the techniques for constructing, orchestrating, and deploying large-scale ML applications as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
  receiving, at a provider network, a machine learning (ML) inference application definition generated by a user of the provider network, the ML inference application definition identifying one or more ML models and one or more data transformation operations to be performed on data to be provided to or generated by ones of the ML models to be used as part of an ML inference application, the ML inference application definition identifying an order in which the one or more ML models and the one or more data transformation operations are executed relative to each other, wherein the ML inference application definition is configured to be capable of identifying a plurality of different specified ML models, a plurality of different specified data transformation operations, and the order in which the plurality of specified ML models and specified data transformation operations are executed relative to each other;

constructing, at the provider network, the ML inference application based on the ML inference application definition by obtaining code corresponding to each of the one or more ML models and the one or more data transformation operations, wherein the code is obtained based at least in part on the identified one or more ML models;
provisioning a plurality of computing resources to be used to execute the ML inference application, wherein the plurality of computing resources are scaled based at least in part on one or more requirements of the one or more models;
receiving, at an endpoint of the provider network, a request originated by a client to execute the ML inference application;
transmitting a plurality of requests to a plurality of computing resources in the provider network to execute the ML inference application in accordance with the ML inference application definition, wherein the one or more ML models and the one or more data transformation operations are executed in the identified order relative to each other;
obtaining a result based on the execution of the ML inference application; and
transmitting the result to the client.

2. The computer-implemented method of claim 1, wherein:
provisioning the plurality of computing resources comprises:
sending one or more requests to a model hosting system in the provider network to deploy one or more ML models identified in the ML inference application definition; and
configuring one or more computing instances in the provider network to execute one or more data transformation operations in accordance with the ML inference application definition; and
the method further comprises configuring the endpoint to be associated with the ML inference application.

3. The computer-implemented method of claim 1, wherein the ML inference application definition comprises an inference graph comprising one or more nodes representing the one or more ML models and one or more edges representing one or more data transformation operations to be performed on data to be provided to or generated by the one or more ML models.

4. A computer-implemented method comprising:
receiving, at a provider network, a machine learning (ML) inference application definition generated by a user of the provider network, the ML inference application definition identifying one or more ML models and one or more data transformation operations to be performed on data to be provided to or generated by ones of the ML models to be used as part of an ML inference application, the ML inference application definition identifying an order in which the one or more ML models and the one or more data transformation operations are executed relative to each other, wherein the ML inference application definition is configured to be capable of identifying a plurality of different specified ML models, a plurality of different specified data transformation operations, and the order in which the plurality of specified ML models and specified data transformation operations are executed relative to each other;
constructing, at the provider network, the ML inference application based on the ML inference application definition by obtaining code corresponding to each of the one or more ML models and the one or more data transformation operations, wherein the code is obtained based at least in part on the identified one or more ML models;
receiving, at an endpoint of the provider network, a request originated by a client to execute the ML inference application;
transmitting a plurality of requests to a plurality of computing resources in the provider network to execute the ML inference application in accordance with the ML inference application definition, wherein the one or more ML models and the one or more data transformation operations are executed in the identified order relative to each other, and wherein the plurality of computing resources are scaled based at least in part on one or more requirements of the one or more models;
obtaining a result based on the execution of the ML inference application; and
transmitting the result to the client.

5. The computer-implemented method of claim 4, wherein the ML inference application definition comprises an inference graph comprising one or more nodes representing the one or more ML models and one or more edges representing one or more data transformation operations to be performed on data to be provided to or generated by the one or more ML models.

6. The computer-implemented method of claim 4, wherein the ML inference application definition includes domain specific language (DSL) code for defining one or more ML models and one or more data transformation operations to be performed on data to be provided to or generated by ones of the one or more ML models.

7. The computer-implemented method of claim 4, further comprising:
provisioning the computing resources to execute the ML inference application, wherein provisioning the computing resources comprises:
sending one or more requests to a model hosting system in the provider network to deploy one or more ML models identified in the ML inference application definition; and
configuring one or more computing instances in the provider network to execute one or more data transformation operations in accordance with the ML inference application definition; and
configuring the endpoint to be associated with the ML inference application.

8. The computer-implemented method of claim 4, further comprising:
receiving a request to update the ML inference application;
identifying, based on the request, at least one ML model or data transformation operation to be added to or removed from the ML inference application; and
provisioning or deprovisioning one or more computing resources for the at least one ML model or data transformation operation.

9. The computer-implemented method of claim 4, wherein transmitting a plurality of requests to a plurality of computing resources in the provider network to execute the ML inference application in accordance with the ML inference application definition comprises:
transmitting a first request to a ML model deployed within a model hosting system of the provider network to cause the ML model hosting system to generate an inference in accordance with the ML inference application definition; and transmitting a second request to one or more computing instances implemented by a second one or more computing devices of the provider network to execute one or more data transformation operations in accordance with the ML inference application definition.

10. The computer-implemented method of claim 9, wherein the model hosting system comprises a machine learning model hosting service or a hardware virtualization service in the provider network.

11. The computer-implemented method of claim 9, wherein transmitting a plurality of requests to a plurality of computing resources in the provider network to execute the ML inference application in accordance with the ML inference application definition comprises:

transmitting a third request to an on-demand code execution service of the provider network to execute one or more data transformation operations as one or more serverless functions in accordance with the ML inference application definition.

12. The computer-implemented method of claim 4, wherein the ML inference application definition identifies the ML models and data transformation operations to be performed on data to be provided to or generated by the ML models but does not specify code for implementing the ML models and the data transformation operations.

13. The computer-implemented method of claim 4, further comprising providing via a user interface of the client, performance metrics information related to the execution of the plurality of computing resources in the provider network involved in the execution of the ML inference application.

14. The computer-implemented method of claim 4, further comprising:

monitoring a volume of requests originated by the client to execute the ML inference application;

scaling the provisioned plurality of computing resources up in response to the volume of requests exceeding a first threshold; and scaling the provisioned plurality of computing resources down in response to the volume of requests being determined to be below a second threshold.

15. A system comprising:

a first one or more electronic devices of a provider network to implement a machine learning (ML) service, each of the first one or more electronic devices comprising a corresponding processor and a memory, the machine learning service to host one or more ML models to generate inferences responsive to requests; and a second or more electronic devices of the provider network to implement an ML application orchestration service, each of the second one or more electronic devices comprising a corresponding processor and a memory, the ML application orchestration service including instructions that upon execution by the processor cause the ML application orchestration service to:

receive an ML inference application definition originated by a user of the provider network, the ML inference application definition identifying one or more ML models and one or more data transformation operations to be performed on data to be provided to or generated by ones of the ML models to be used as part of a ML inference application, the ML inference application definition identifying an order in which the one or more ML models and the one or more data transformation operations are executed relative to each other, wherein the ML inference application definition is configured to be capable of identifying a plurality of different specified ML models, a plurality of different specified data transformation operations, and the order in which the plurality of specified ML models and specified data transformation operations are executed relative to each other;

constructing, at the provider network, the ML inference application based on the ML inference application definition by obtaining code corresponding to each of the one or more ML models and the one or more data transformation operations, wherein the code is obtained based at least in part on the identified one or more ML models;

receive a request originated by a client associated with the user to execute the ML inference application;

transmit a plurality of requests to a plurality of computing resources in the provider network to execute the ML inference application in accordance with the ML inference application definition, wherein at least one of the plurality of requests is sent to at least one of the one or more ML models that are hosted by the ML application orchestration service, wherein the one or more ML models and the one or more data transformation operations are executed in the identified order relative to each other, and wherein the plurality of computing resources are scaled based at least in part on one or more requirements of the one or more models;

obtain a result based on the execution of the ML inference application; and transmit the result to the client.

16. The system of claim 15, wherein the ML inference application definition comprises an inference graph comprising one or more nodes representing the one or more ML models and one or more edges representing one or more data transformation operations to be performed on data to be provided to or generated by the one or more ML models.

17. The system of claim 15, wherein the ML inference application definition includes domain specific language (DSL) code for defining one or more ML models and one or more data transformation operations to be performed on the one or more ML models.

18. The system of claim 15, wherein the instructions upon execution further cause the ML application orchestration service to:

provision the computing resources to execute the ML inference application, wherein to provision the computing resources the ML application orchestration service is to:

send one or more requests to a model hosting system of the ML service to deploy the one or more ML models identified in the ML inference application definition; and configure one or more computing instances to execute one or more data transformation operations in accordance with the ML inference application definition; and configure an endpoint to be associated with the ML inference application.

19. The system of claim 15, wherein the instructions upon execution further cause the ML application orchestration service to:

receive a request to update the ML inference application;

identify, based on the request, at least one ML model or data transformation operation to be added to or removed from the ML inference application; and provision or deprovision one or more computing resources for the at least one ML model or data transformation operation.

20. The system of claim 15, wherein the ML inference application definition identifies the one or more ML models and one or more data transformation operations to be performed on data to be provided to or generated by ones of the ML models but does not specify code for implementing the ML models and the data transformation operations.

\* \* \* \* \*